(12) United States Patent
Hiromasa et al.

(10) Patent No.: US 11,139,952 B2
(45) Date of Patent: Oct. 5, 2021

(54) HOMOMORPHIC COMPUTATION DEVICE, ENCRYPTION SYSTEM, AND COMPUTER READABLE MEDIUM

(71) Applicant: Mitsubishi Electric Corporation, Tokyo (JP)

(72) Inventors: Ryo Hiromasa, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 201 days.

(21) Appl. No.: 16/467,442

(22) PCT Filed: Jan. 18, 2017

(86) PCT No.: PCT/JP2017/001589
§ 371 (c)(1),
(2) Date: Jun. 6, 2019

(87) PCT Pub. No.: WO2018/134922
PCT Pub. Date: Jul. 26, 2018

(65) Prior Publication Data
US 2020/0127810 A1    Apr. 23, 2020

(51) Int. Cl.
*H04L 9/00* (2006.01)
*H04L 9/08* (2006.01)

(52) U.S. Cl.
CPC ............ *H04L 9/008* (2013.01); *H04L 9/0869* (2013.01)

(58) Field of Classification Search
CPC .......... H04L 9/008; H04L 9/0869; G09C 1/00
See application file for complete search history.

(56) References Cited

U.S. PATENT DOCUMENTS

2013/0216044 A1* 8/2013 Gentry ............... H04L 9/008
380/277
2013/0230168 A1    9/2013 Takenouchi
(Continued)

FOREIGN PATENT DOCUMENTS

JP    2007-114494 A    5/2007
JP    2014-78770 A    5/2014
(Continued)

OTHER PUBLICATIONS

Brakerski et al., "Targeted Homomorphic Attribute Based Encryption", TCC 2016: Theory of Cryptography, 2016, pp. 330-360 (Total No. pp. 29).
(Continued)

*Primary Examiner* — Meng Li
(74) *Attorney, Agent, or Firm* — Birch, Stewart, Kolasch & Birch, LLP

(57) ABSTRACT

An encryption device generates a ciphertext ct including an encryption element C in which a plaintext $\mu$ is set, an encryption element $C_x$ in which an attribute x is set, and an encryption element F that is not to be decrypted with a decryption key $sk_f$ corresponding to a policy f satisfied by the attribute x and in which the plaintext $\mu$ is set. A homomorphic computation device converts the ciphertext ct into a ciphertext $ct^\sim$ by converting, with the encryption element F, the encryption element C included in the ciphertext ct into an encryption element $C^\sim$ that can be decrypted with the decryption key $sk_F$ corresponding to a policy set F acquired by a policy acquisition unit. The homomorphic computation device performs homomorphic computation g on the ciphertext $ct^\sim$ to generate a ciphertext $ct^*$.

11 Claims, 14 Drawing Sheets

(56) References Cited

U.S. PATENT DOCUMENTS

| | | | |
|---|---|---|---|
| 2013/0246813 A1* | 9/2013 | Mori | H04L 9/14 713/193 |
| 2013/0333024 A1 | 12/2013 | Takenouchi | |
| 2013/0333051 A1 | 12/2013 | Takenouchi | |
| 2015/0046450 A1 | 2/2015 | Yoshino et al. | |
| 2015/0278553 A1 | 10/2015 | Matsuda et al. | |
| 2015/0381578 A1* | 12/2015 | Thota | G06F 21/56 713/168 |
| 2017/0104752 A1* | 4/2017 | Sakemi | H04L 9/008 |

FOREIGN PATENT DOCUMENTS

| | | |
|---|---|---|
| JP | 2015-35072 A | 2/2015 |
| JP | 2016-143048 A | 8/2016 |
| WO | WO 2012/067214 A1 | 5/2012 |
| WO | WO 2012/121024 A1 | 9/2012 |
| WO | WO 2012/121025 A1 | 9/2012 |
| WO | WO 2014/112182 A1 | 7/2014 |
| WO | WO 2016/103960 A1 | 6/2016 |

OTHER PUBLICATIONS

Gentry et al., "Homomorphic Encryption from Learning with Errors: Conceptually-Simpler, Asymptotically-Faster, Attribute-Based", CRYPTO 2013: Advances in Cryptology, 2013, pp. 75-92 (Total No. pp. 25).

International Search Report issued in PCT/JP2017/001589 (PCT/ISA/210), dated Apr. 18, 2017.

Peikert et al., "Multi-Key FHE from LWE, Revisited", TCC 2016: Theory of Cryptology, Cryptology ePrint Archive: Report 2016/196, (Total No. pp. 20).

* cited by examiner

HOMOMORPHIC COMPUTATION DEVICE, ENCRYPTION SYSTEM, AND COMPUTER READABLE MEDIUM

TECHNICAL FIELD

The present invention relates to a technique for performing computation with data encrypted.

BACKGROUND ART

Homomorphic encryption is a cryptographic technique capable of computing with data encrypted. Recently, while the use of cloud services is becoming widespread, it is conceivable to store data in the cloud after encrypting the data, due to concerns about cracking and reliability of the cloud. Homomorphic encryption is a technique that enables cloud services to be used without compromising safety, because computations can be performed on encrypted data without decryption.

An encryption technique that enables flexible control of a decryptor in accordance with specified conditions in order to improve the convenience of homomorphic encryption is attribute-based homomorphic encryption. In the attribute-based homomorphic encryption, a ciphertext is related to a certain attribute, a decryption key is related to a certain decryption permission condition, and a correct plaintext can be obtained only when a ciphertext is decrypted with such a key having an attribute satisfying the decryption permission condition.

Non Patent Literature 1 describes the first method of the attribute-based homomorphic encryption. In the method described in Non Patent Literature 1, there is a problem that homomorphic computation can be performed only between ciphertexts related to a same attribute.

Non Patent Literature 2 describes a method of the attribute-based homomorphic encryption that solves the problem of Non Patent Literature 1.

Non Patent Literature 2 illustrates a configuration of two encryption techniques called single target attribute-based homomorphic encryption and multiple target attribute-based homomorphic encryption. The single target attribute-based homomorphic encryption is an encryption method that can perform homomorphic computation for a certain decryption permission condition as long as both ciphertexts are related to an attribute satisfying the condition. The multiple target attribute-based homomorphic encryption is an encryption method that can perform homomorphic computation for a plurality of decryption permission conditions as long as both ciphertexts are related to an attribute satisfying any of conditions.

CITATION LIST

Non Patent Literature

Non Patent Literature 1: C. Gentry, A. Sahai, and B. Waters. "Homomorphic Encryption from Learning with Errors: Conceptually-Simpler, Asymptotically-Faster, Attribute-Based". In CRYPTO 2013, pages 75-92, 2013.
Non Patent Literature 2: Z. Brakerski, D. Cash, R. Tsabary, and H. Wee. "Targeted Homomorphic Attribute Based Encryption". In TCC 2016-B, pages 330-360, 2016.
Non Patent Literature 3: C. Peikert, and S. Shiehian "Multi-Key FHE from LWE, revisited" 2016.

SUMMARY OF INVENTION

Technical Problem

In the multiple target attribute-based homomorphic encryption illustrated in Non Patent Literature 2, a ciphertext Y obtained by performing homomorphic computation on a ciphertext X subject to computation is associated with a set F of decryption permission conditions that enable decryption of the ciphertext X subject to computation. In a case of performing homomorphic computation again with a different ciphertext Z before homomorphic computation with use of the ciphertext Y, homomorphic computation cannot be performed unless a decryption permission condition of the ciphertext Z is included in the set F of decryption permission conditions associated with the ciphertext Y.

Therefore, depending on decryption conditions of the ciphertexts X, Y, and Z, it is necessary to collect all the ciphertexts X, Y, and Z in advance and perform homomorphic computation at the same time. Therefore, for example, in performing homomorphic computation on encrypted time series data, an enormous storage capacity is required for collecting and holding all the time series data to be used for computation in advance.

It is an object of the present invention to enable flexible homomorphic computation.

Solution to Problem

A homomorphic computation device according to the present invention includes:
  a ciphertext acquisition unit to acquire a ciphertext ct including an encryption element C in which a plaintext $\mu$ is set, an encryption element $C_x$ in which an attribute x is set, and an encryption element F in which the plaintext $\mu$ is set, the encryption element F being not to be decrypted with a decryption key $sk_f$ corresponding to a policy f satisfied by the attribute x;
  a policy acquisition unit to acquire a policy set F that is a set of policies;
  a ciphertext conversion unit to convert the ciphertext ct into a ciphertext ct~ by converting, with the encryption element F, the encryption element C included in the ciphertext ct acquired by the ciphertext acquisition unit into an encryption element C~ that can be decrypted with a decryption key $sk_F$ corresponding to the policy set F acquired by the policy acquisition unit; and
  a homomorphic computation unit to perform homomorphic computation g on the ciphertext ct~ converted by the ciphertext conversion unit, to generate a ciphertext ct*.

Advantageous Effects of Invention

In the present invention, an encryption element C is converted into an encryption element C~ with use of an encryption element F. This makes it possible to perform homomorphic computation without associating an element in the encryption element C with a policy set F. Therefore, it becomes possible to perform flexible homomorphic computation again by using a ciphertext ct* as an input.

DESCRIPTION OF EMBODIMENTS

First Embodiment

*Description of Configuration*

Figure 1:
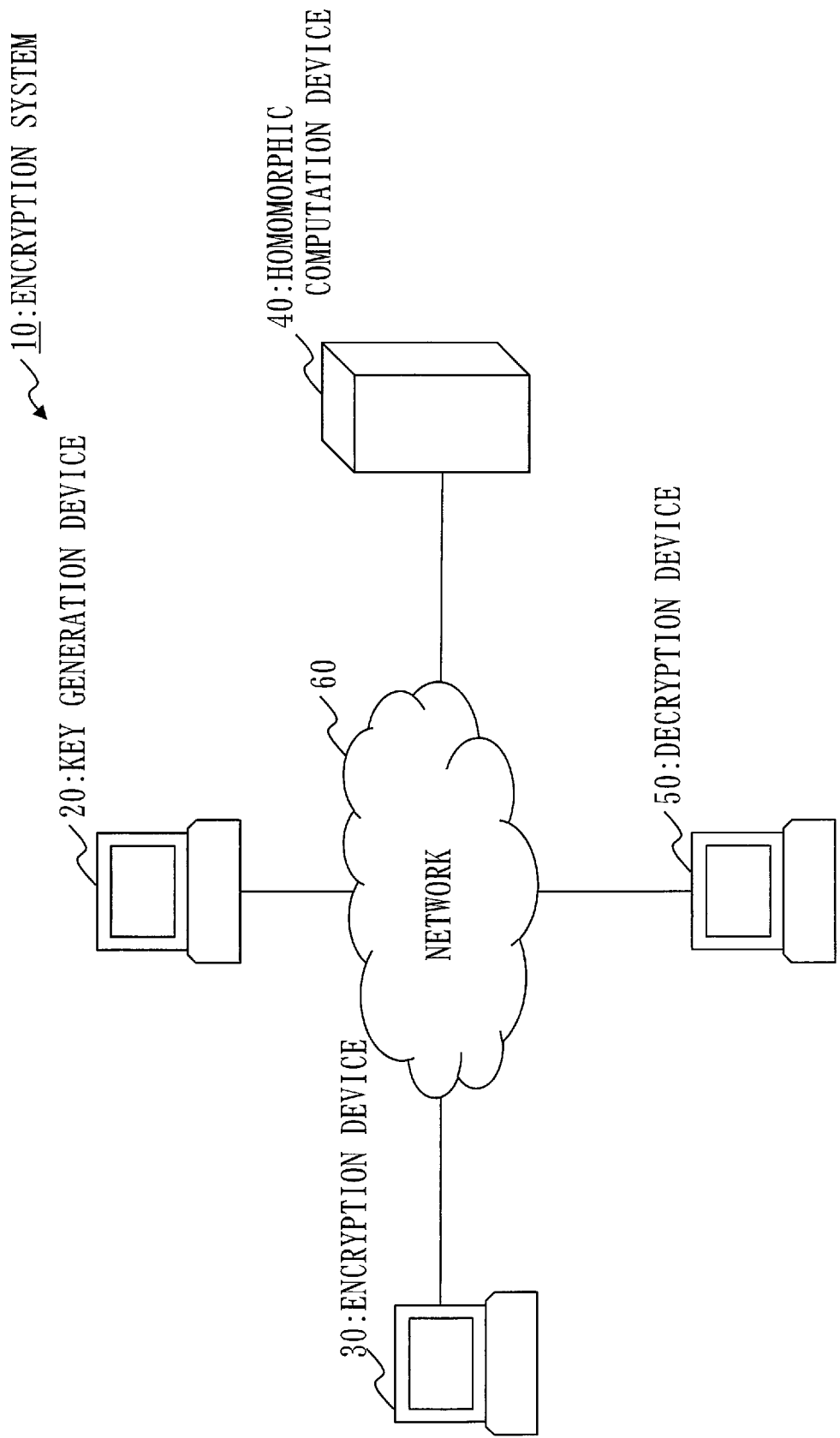
FIG. 1 is a configuration diagram of an encryption system 10 according to a first embodiment.

With reference to FIG. 1, a configuration of an encryption system 10 according to a first embodiment will be described.

The encryption system 10 includes a key generation device 20, an encryption device 30, a homomorphic computation device 40, and a decryption device 50.

The key generation device 20, the encryption device 30, the homomorphic computation device 40, and the decryption device 50 are connected via a network 60. As a specific example, the network 60 is the Internet. The network 60 may be another type of network such as a local area network (LAN).

Figure 2:
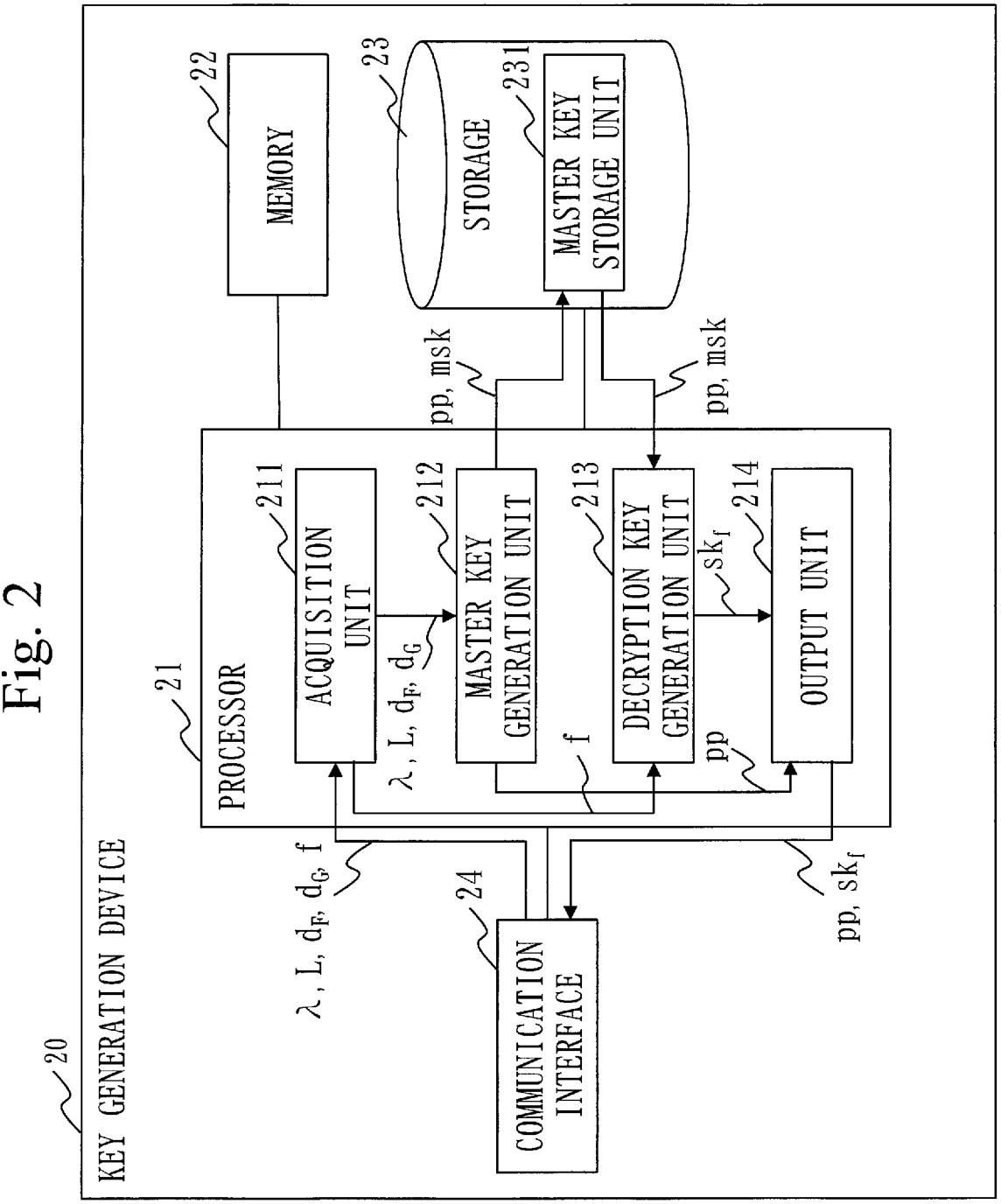
FIG. 2 is a configuration diagram of a key generation device 20 according to the first embodiment.

With reference to FIG. 2, a configuration of the key generation device 20 according to the first embodiment will be described.

The key generation device 20 is a computer.

The key generation device 20 includes hardware of a processor 21, a memory 22, a storage 23, and a communication interface 24. The processor 21 is connected to other pieces of hardware via a signal line, and controls these other pieces of hardware.

The key generation device 20 includes an acquisition unit 211, a master key generation unit 212, a decryption key generation unit 213, and an output unit 214, as functional components. Functions of the acquisition unit 211, the master key generation unit 212, the decryption key generation unit 213, and the output unit 214 are realized by software.

The storage 23 stores a program for realizing functions of the acquisition unit 211, the master key generation unit 212, the decryption key generation unit 213, and the output unit 214. This program is read into the memory 22 by the processor 21 and executed by the processor 21. Thus, functions of the acquisition unit 211, the master key generation unit 212, the decryption key generation unit 213, and the output unit 214 are realized.

In addition, the storage 23 realizes a function of a master key storage unit 231.

Figure 3:
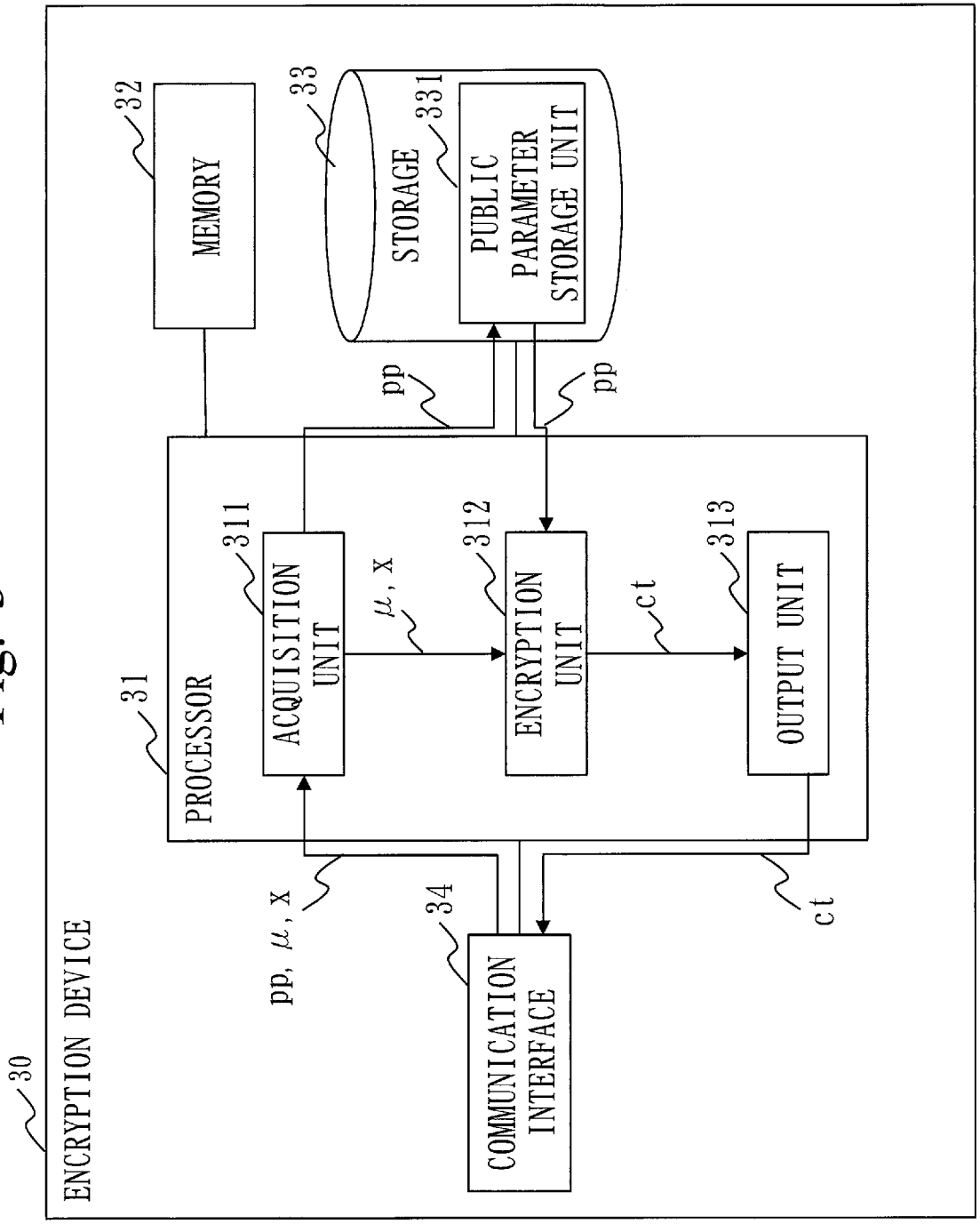
FIG. 3 is a configuration diagram of an encryption device 30 according to the first embodiment.

With reference to FIG. 3, a configuration of the encryption device 30 according to the first embodiment will be described.

The encryption device 30 is a computer.

The encryption device 30 includes hardware of a processor 31, a memory 32, a storage 33, and a communication interface 34. The processor 31 is connected to other pieces of hardware via a signal line, and controls these other pieces of hardware.

The encryption device 30 includes an acquisition unit 311, an encryption unit 312, and an output unit 313, as functional components. Functions of the acquisition unit 311, the encryption unit 312, and the output unit 313 are realized by software.

The storage 33 stores a program for realizing functions of the acquisition unit 311, the encryption unit 312, and the output unit 313. This program is read into the memory 32 by the processor 31 and executed by the processor 31. Thus, functions of the acquisition unit 311, the encryption unit 312, and the output unit 313 are realized.

In addition, the storage 33 realizes a function of a public parameter storage unit 331.

Figure 4:
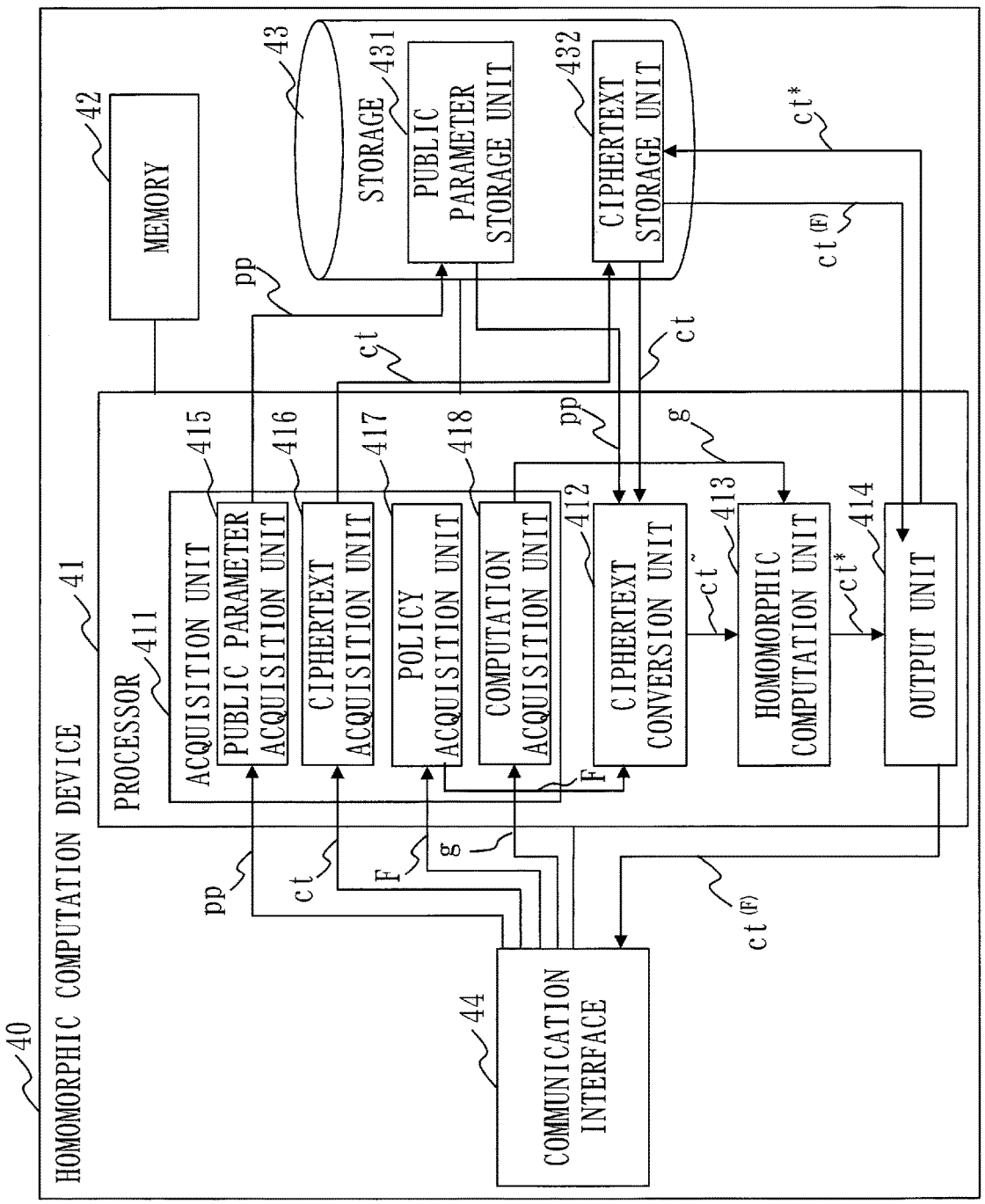
FIG. 4 is a configuration diagram of a homomorphic computation device 40 according to the first embodiment.

With reference to FIG. 4, a configuration of the homomorphic computation device 40 according to the first embodiment will be described.

The homomorphic computation device 40 is a computer.

The homomorphic computation device 40 includes hardware of a processor 41, a memory 42, a storage 43, and a communication interface 44. The processor 41 is connected to other pieces of hardware via a signal line, and controls these other pieces of hardware.

The homomorphic computation device 40 includes an acquisition unit 411, a ciphertext conversion unit 412, a homomorphic computation unit 413, and an output unit 414, as functional components. The acquisition unit 411 includes a public parameter acquisition unit 415, a ciphertext acquisition unit 416, a policy acquisition unit 417, and a computation acquisition unit 418. Functions of the acquisition unit 411, the ciphertext conversion unit 412, the homomorphic computation unit 413, the output unit 414, the public parameter acquisition unit 415, the ciphertext acquisition unit 416, the policy acquisition unit 417, and the computation acquisition unit 418 are realized by software.

The storage 43 stores a program for realizing functions of the acquisition unit 411, the ciphertext conversion unit 412, the homomorphic computation unit 413, the output unit 414, the public parameter acquisition unit 415, the ciphertext acquisition unit 416, the policy acquisition unit 417, and the computation acquisition unit 418. This program is read into the memory 42 by the processor 41 and executed by the processor 41. Thus, functions of the acquisition unit 411, the ciphertext conversion unit 412, the homomorphic computation unit 413, the output unit 414, the public parameter acquisition unit 415, the ciphertext acquisition unit 416, the policy acquisition unit 417, and the computation acquisition unit 418 are realized.

In addition, the storage 43 realizes functions of a public parameter storage unit 431 and a ciphertext storage unit 432.

Figure 5:
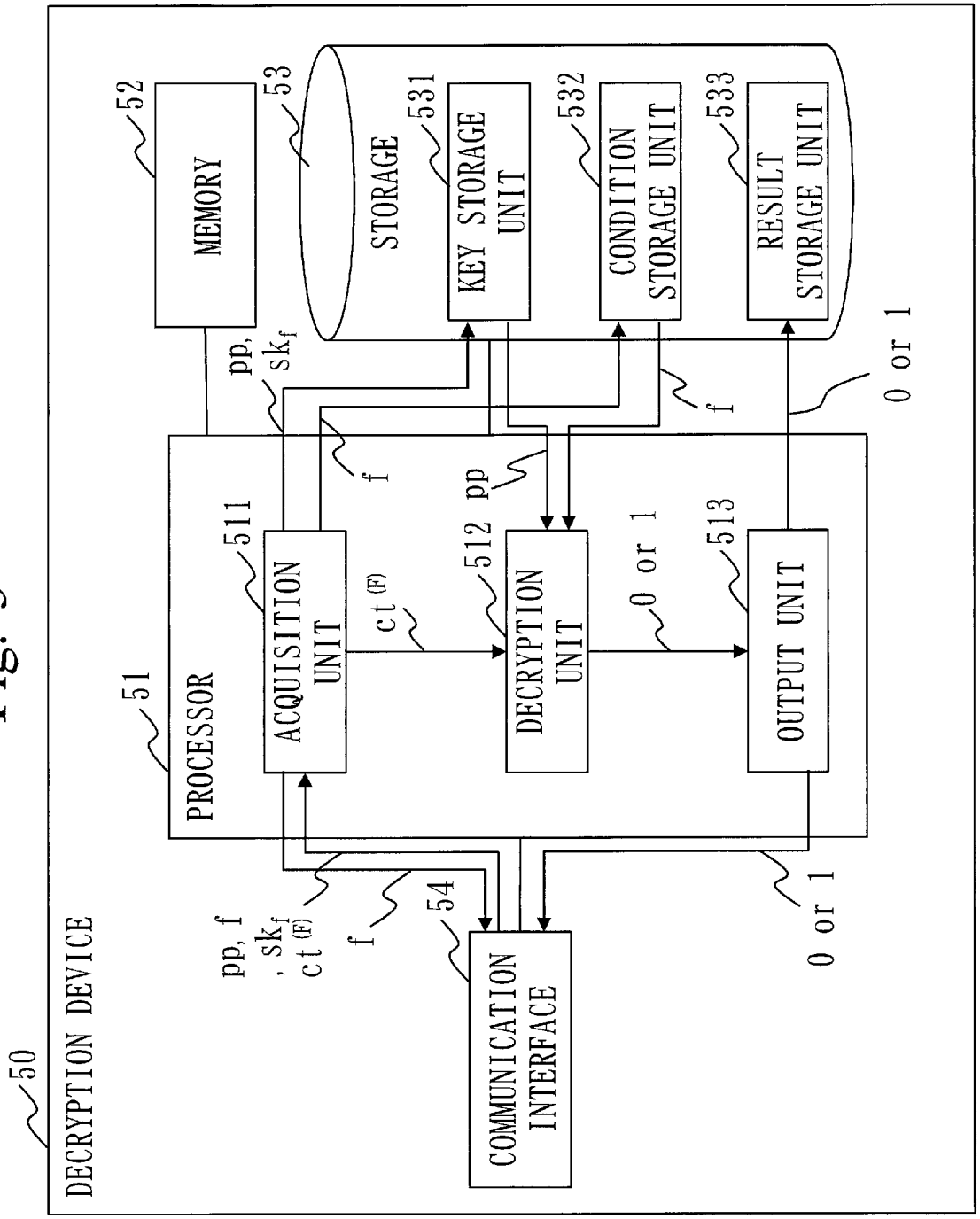
FIG. 5 is a configuration diagram of a decryption device 50 according to the first embodiment.

With reference to FIG. 5, a configuration of the decryption device 50 according to the first embodiment will be described.

The decryption device 50 is a computer.

The decryption device 50 includes hardware of a processor 51, a memory 52, a storage 53, and a communication interface 54. The processor 51 is connected to other pieces of hardware via a signal line, and controls these other pieces of hardware.

The decryption device 50 includes an acquisition unit 511, a decryption unit 512, and an output unit 513, as functional components. Functions of the acquisition unit 511, the decryption unit 512, and the output unit 513 are realized by software.

The storage 53 stores a program for realizing functions of the acquisition unit 511, the decryption unit 512, and the output unit 513. This program is read into the memory 52 by the processor 51 and executed by the processor 51. Thus, functions of the acquisition unit 511, the decryption unit 512, and the output unit 513 are realized.

In addition, the storage 53 realizes functions of a key storage unit 531, a condition storage unit 532, and a result storage unit 533.

The processors 21, 31, 41, and 51 are integrated circuits (ICs) that perform computation processing. As a specific example, the processors 21, 31, 41, and 51 are a central processing unit (CPU), a digital signal processor (DSP), or a graphics processing unit (GPU).

The memories 22, 32, 42, and 52 are storage devices that temporarily store data. As a specific example, the memories 22, 32, 42, and 52 are a static random access memory (SRAM) or a dynamic random access memory (DRAM).

The storages 23, 33, 43, and 53 are storage devices that store data. As a specific example, the storages 23, 33, 43, and 53 are a hard disk drive (HDD). In addition, the storages 23, 33, 43, and 53 may be a portable storage medium such as a secure digital (SD, registered trademark) memory card, a compact flash (CF), a NAND flash, a flexible disk, an optical disk, a compact disk, a Blu-Ray (registered trademark) disk, or a digital versatile disk (DVD).

The communication interfaces 24, 34, 44, and 54 are interfaces to communicate with external devices. As a specific example, the communication interfaces 24, 34, 44, and 54 are ports of Ethernet (registered trademark), a universal serial bus (USB), or a high-definition multimedia interface (HDMI, registered trademark).

In FIG. 2, only one processor 21 is illustrated. However, the key generation device 20 may include a plurality of processors substituting for the processor 21. Similarly, the encryption device 30 may include a plurality of processors substituting for the processor 31, the homomorphic computation device 40 may include a plurality of processors substituting for the processors 41, and the decryption device 50 may include a plurality of processors substituting for the processor 51. These plurality of processors share execution of a program for realizing a function of each functional component. Similarly to the processors 21, 31, 41, and 51, each processor is an IC that performs computation processing.

*Description of Operation*

With reference to FIGS. 6 to 10, an operation of the encryption system 10 according to the first embodiment will be described.

The operation of the encryption system 10 according to the first embodiment corresponds to an encryption method according to the first embodiment. Further, the operation corresponds to processing of an encryption program according to the first embodiment.

The operation of the encryption system 10 is divided into Setup processing, KeyGen processing, Enc processing, Eval processing, and Dec processing.

In the following description, the description is made focusing on parts different from the contents described in Non Patent Literature 2, and some explanation is omitted since parts same as the contents described in Non Patent Literature 2 are contents already known.

Reference symbols in the following description will be described.

n, q, and $\chi$ are parameters in a learning with errors (LWE) problem. The LWE problem is a known problem. A decisional LWE problem (DLWE problem) is defined as follows.

<DLWE Problem>

Suppose that $\lambda$ is a security parameter, $n=n(\lambda)$ and $q=q(\lambda)$ are integers, and $\chi=\chi(\lambda)$ is probability distribution on an integer Z. The problem of $DLWE_{n,q,\chi}$ is that $(A, s^T A + e^T)$ and $(A, u^T)$ are computationally indistinguishable when Formula 11 holds for all $m=\text{poly}(n)$.

$$A \leftarrow \mathbb{Z}_q^{n \times m}, s \leftarrow \mathbb{Z}_q^n, e \leftarrow \chi^m, u \leftarrow \mathbb{Z}_q^m \quad \text{[Formula 11]}$$

m, N, M, and $g^T$ are as represented in Formula 12.

$$m = O(n \log q),$$

$$n := \lceil \log q \rceil,$$

$$M := (m+N+1)\lceil \log q \rceil,$$

$$g^T := (1, 2, \ldots, 2\lceil \log q \rceil) \quad \text{[Formula 12]}$$

For any $x \in \mathbb{Z}_q$, y represented in Formula 13 is a vector that satisfies Formula 14.

$$y := g^{-1}(x) \in \{0,1\}^{\lceil \log q \rceil} \quad \text{[Formula 13]}$$

$$\langle y, g \rangle = x \in \mathbb{Z}_q \quad \text{[Formula 14]}$$

For any natural numbers n and m, $I_n$ is a unit matrix of n rows and n columns, and $0_{n \times m}$ is a matrix of n rows and m columns with all elements 0. For any $i \in [n]$, $e_i \in \{0, 1\}^n$ is a standard basis vector in which n-th element is 1 and others are 0. Note that $i \in [n]$ means $i = 1, \ldots, n$.

$F \subseteq \{0, 1\}^L \rightarrow \{0, 1\}$ is a class of a policy that can be calculated by Boolean circuit of a depth $d_F$. $G \subseteq \{0, 1\}^* \rightarrow \{0, 1\}$ is a class of computation that can be calculated by Boolean circuit of a depth $d_G$.

Figure 6:
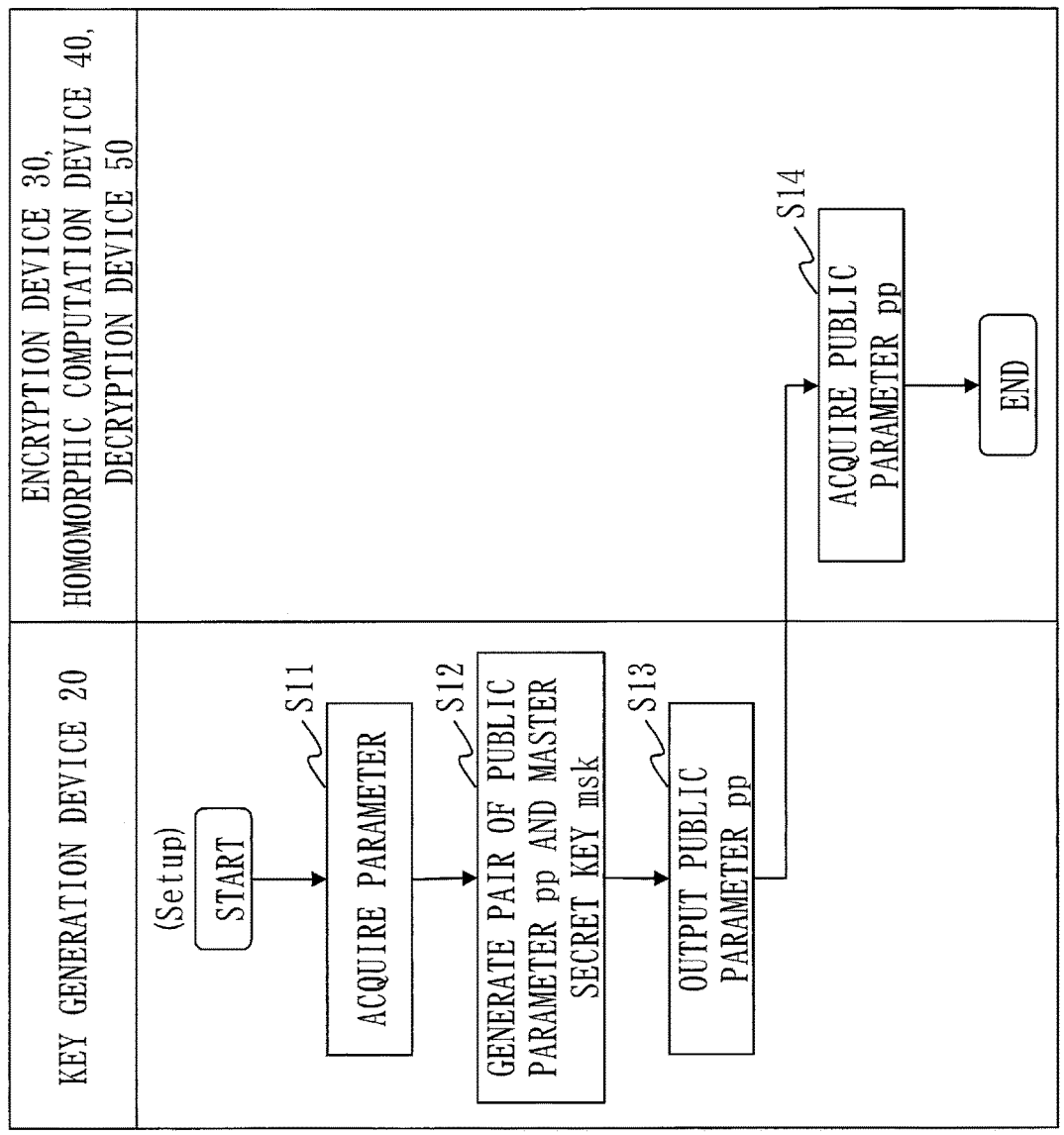
FIG. 6 is a flowchart of Setup processing according to the first embodiment.

With reference to FIG. 6, the Setup processing according to the first embodiment will be described.

The Setup processing is mainly executed by the key generation device 20 at a time of initial setting or the like of the encryption system 10. The Setup processing according to the first embodiment corresponds to a master key generation method and processing of a master key generation program according to the first embodiment.

(Step S11: Acquisition Process)

The acquisition unit 211 of the key generation device 20 acquires the parameters $\lambda$, L, $d_F$, and $d_G$.

Specifically, the acquisition unit 211 accepts the parameters $\lambda$, L, $d_F$, and $d_G$ inputted by an administrator or the like of the encryption system 10, via the communication interface 24. The acquisition unit 211 writes the accepted parameters $\lambda$, L, $d_F$, and $d_G$ into the memory 22.

(Step S12: Master Key Generation Process)

The master key generation unit 212 of the key generation device 20 generates a pair of a public parameter pp and a master secret key msk.

Specifically, the master key generation unit 212 generates a pair $(A, A_{\tau 0}^{-1})$ of a matrix A and a trapdoor $A_{\tau 0}^{-1}$, as represented in Formula 15.

$$(A, A_{\tau 0}^{-1}) \xleftarrow{R} TrapGen(1^n, q, m) \quad \text{[Formula 15]}$$

The TrapGen algorithm is described in Non Patent Literature 2. Here, the matrix A is a matrix represented in Formula 16, and the trapdoor $A_{\tau 0}^{-1}$ is an algorithm represented in Formula 17.

$$A \in \mathbb{Z}_q^{n \times m} \qquad \text{[Formula 16]}$$

$$A_{\tau 0}^{-1}(u) = x,$$

$$Ax = u \qquad \text{[Formula 17]}$$

The master key generation unit 212 generates matrices B, $B_0, B_1, \ldots, B_L$ and defines $\vec{B}_x$ as represented in Formula 18.

$$B, B_0, B_1, \ldots, B_L \xleftarrow{U} \mathbb{Z}_q^{n \times N}, \qquad \text{[Formula 18]}$$

$$\vec{B}_x := [B_1, \ldots, B_L]$$

The master key generation unit 212 generates a vector v and a seed σ of pseudo random function (PRF) as represented in Formula 19.

$$v \xleftarrow{U} \mathbb{Z}_q^n, \qquad \text{[Formula 19]}$$

$$\sigma \xleftarrow{R} PRF.Gen(1^\lambda)$$

The PRF.Gen algorithm is described in Non Patent Literature 2.

The master key generation unit 212 sets (A, $B_0$, $\vec{B}_x$, B, v) as the public parameter pp, and ($A_{\tau 0}^{-1}$, σ) as the master secret key msk. The master key generation unit 212 writes the public parameter pp into the memory 22, and writes the public parameter pp and the master secret key msk into the master key storage unit 231.

(Step S13: Output Process)

The output unit 214 of the key generation device 20 outputs the public parameter pp.

Specifically, the output unit 214 reads the public parameter pp from the memory 22. Then, the output unit 214 transmits the public parameter pp to the encryption device 30, the homomorphic computation device 40, and the decryption device 50 via the communication interface 24.

(Step S14: Public Parameter Acquisition Process)

The acquisition unit 311 of the encryption device 30, the public parameter acquisition unit 415 of the homomorphic computation device 40, and the acquisition unit 511 of the decryption device 50 acquire the public parameter pp.

Specifically, the acquisition unit 311 receives the public parameter pp transmitted by the output unit 214, via the communication interface 34. The acquisition unit 311 writes the received public parameter pp into the public parameter storage unit 331.

Further, the public parameter acquisition unit 415 of the homomorphic computation device 40 receives the public parameter pp transmitted by the output unit 214, via the communication interface 44. The public parameter acquisition unit 415 writes the received public parameter pp into the public parameter storage unit 431.

In addition, the acquisition unit 511 of the decryption device 50 receives the public parameter pp transmitted by the output unit 214, via the communication interface 54. The acquisition unit 511 writes the received public parameter pp into the key storage unit 531.

That is, the key generation device 20 executes the Setup algorithm represented in Formula 20 to generate the public parameter pp and the master secret key msk.

$$\text{Setup}(1^\lambda, 1^L, 1^d_{\mathcal{F}}, 1^d_{\mathcal{G}}) \qquad \text{[Formula 20]}$$

$$(A, A_{\tau 0}^{-1}) \xleftarrow{R} TrapGen(1^n, q, m),$$

$$B, B_0, B_1, \ldots, B_L \xleftarrow{U} \mathbb{Z}_q^{n \times N},$$

$$\vec{B}_x := [B_1, \ldots, B_L],$$

$$v \xleftarrow{U} \mathbb{Z}_q^n,$$

$$\sigma \xleftarrow{R} PRF.Gen(1^\lambda),$$

$$\text{return } pp := (A, B_0, \vec{B}_x, B, v), msk := (A_{\tau 0}, \sigma).$$

Figure 7:
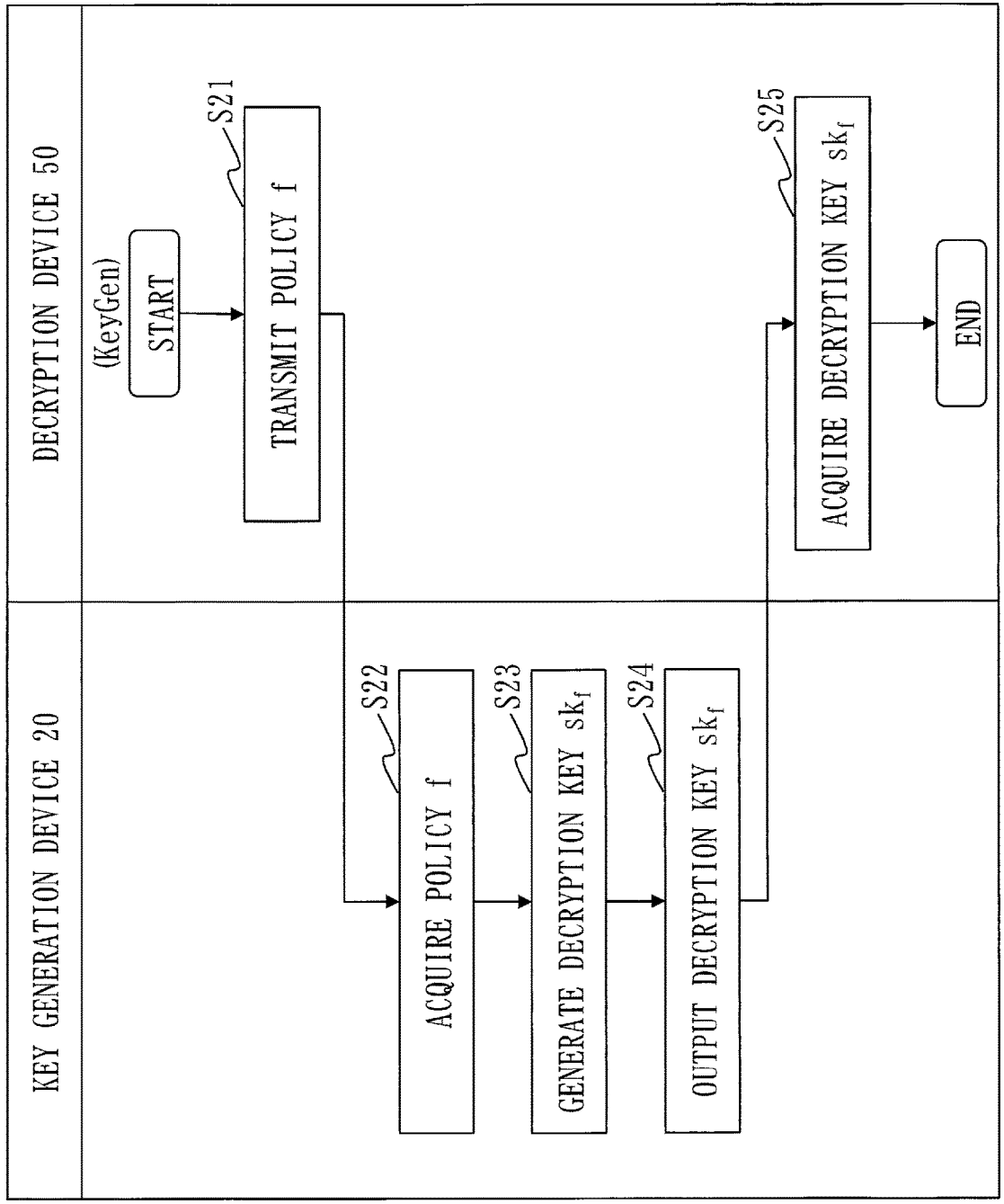
FIG. 7 is a flowchart of KeyGen processing according to the first embodiment.

With reference to FIG. 7, the KeyGen processing according to the first embodiment will be described.

The KeyGen processing is mainly executed by the key generation device 20 in generating a new decryption key $sk_f$. The KeyGen processing according to the first embodiment corresponds to a decryption key generation method and processing of a decryption key generation program according to the first embodiment.

(Step S21: Decryption Key Request Process)

The acquisition unit 511 of the decryption device 50 requests the key generation device 20 to generate the decryption key $sk_f$.

Specifically, the acquisition unit 511 accepts a policy f indicating a decryption permission condition inputted by a user or the like of the decryption device 50. For the policy f, for example, an attribute of the user is set. Then, the acquisition unit 511 transmits the inputted policy f to the key generation device 20, and requests generation of the decryption key $sk_f$ associated with the policy f.

The acquisition unit 511 writes the policy f transmitted when the generation of the decryption key $sk_f$ is requested, into the condition storage unit 532.

(Step S22: Acquisition Process)

The acquisition unit 211 of the key generation device 20 acquires the policy f.

Specifically, the acquisition unit 211 receives the policy f transmitted from the decryption device 50, via the communication interface 24. The acquisition unit 211 writes the received policy f into the memory 22.

(Step S23: Decryption Key Generation Process)

The decryption key generation unit 213 of the key generation device 20 generates the decryption key $sk_f$ associated with the policy f.

Specifically, the decryption key generation unit 213 reads the policy f from the memory 22, and reads the public parameter pp and the master secret key msk from the master key storage unit 231. The decryption key generation unit 213 calculates a matrix $B_f$ as represented in Formula 21.

$$B_f = \text{Eval}(f, \vec{B}_x) \qquad \text{[Formula 21]}$$

The Eval algorithm is described in Non Patent Literature 2.

The decryption key generation unit 213 queries to a random oracle, to obtain a matrix $r'_f = O(A, f) \in \{0, 1\}^N$. That is, the decryption key generation unit 213 generates the random matrix $r'_f$. The decryption key generation unit 213 generates a matrix $r_f$ as represented in Formula 22.

$$r_f \xleftarrow{R} A_\tau^{-1}(-(B_0 + B_f)r'_f - v) \qquad \text{[Formula 22]}$$

Here, τ is as represented in Formula 23.

$$\tau = O(m \cdot NL \cdot (N+1)^{d^{\mathcal{F}}}) \geq \tau_0 \quad \text{[Formula 23]}$$

At this time, since the trapdoor $A_{\tau_0}^{-1}$ is an algorithm represented in Formula 17, Formula 24 is established.

$$[r_f^T \| r_f'^T \| 1] \begin{bmatrix} A^T \\ (B_0 + B_f)T \\ v^T \end{bmatrix} = 0_n \quad \text{[Formula 24]}$$

The decryption key generation unit 213 writes the matrix $r_f$ into the memory 22, as the decryption key $sk_f$.

(Step S24: Output Process)

The output unit 214 of the key generation device 20 outputs the decryption key $sk_f$.

Specifically, the output unit 214 reads the decryption key $sk_f$ from the memory 22. Then, the output unit 214 transmits the decryption key $sk_f$ to the decryption device 50 via the communication interface 24.

(Step S25: Decryption Key Acquisition Process)

The acquisition unit 511 of the decryption device 50 acquires the decryption key $sk_f$.

Specifically, the acquisition unit 511 receives the decryption key $sk_f$ transmitted by the output unit 214, via the communication interface 54. The acquisition unit 511 writes the received decryption key $sk_f$ into the key storage unit 531.

That is, the key generation device 20 executes the Key-Gen algorithm represented in Formula 25 to generate the decryption key $sk_f$.

KeyGen($f \in \mathcal{F}$) [Formula 25]

Figure 8:
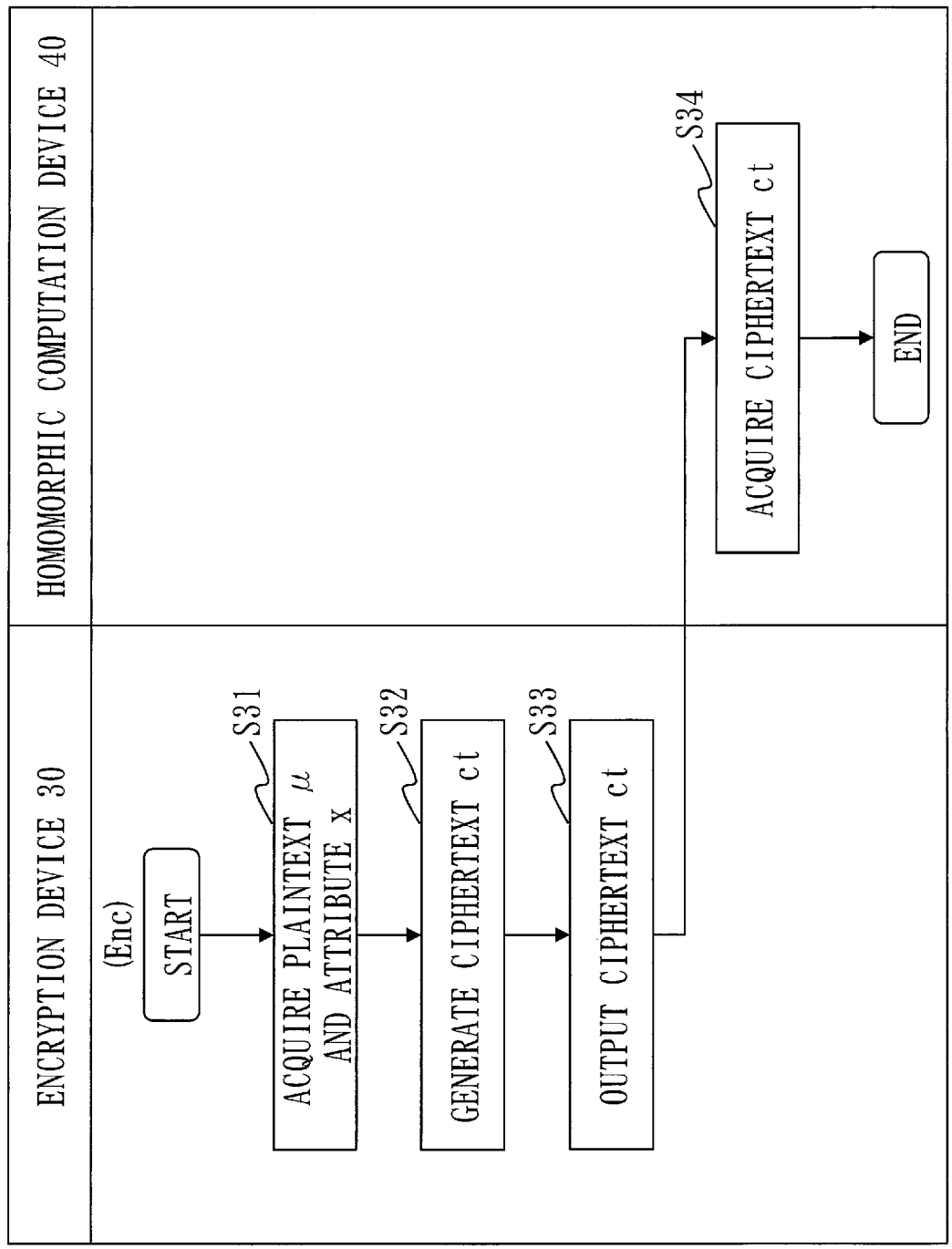
FIG. 8 is a flowchart of Enc processing according to the first embodiment.

$B_f := \text{Eval}(f, \vec{B}_x), r_f' = O(A, f) \in \{0, 1\}^N,$ $\rho \xleftarrow{U} PRF.\text{Gen}(\sigma, f),$ $r_f \xleftarrow{R} A_\tau^{-1}(-(B_0 + B_f)r_f' - v),$ where $\tau = O(m \cdot NL \cdot (N+1)_{\mathcal{F}}^d \geq \tau_0),$ Note that $[r_f^T \| r_f'^T \| 1] \cdot [A^T \|(B_0 + B_f)T \| v^T] = 0_n,$ return $sk := [r_f].$ With reference to FIG. 8, the Enc processing according to the first embodiment will be described.

The Enc processing is mainly executed by the encryption device 30 in generating a ciphertext ct. The Enc processing according to the first embodiment corresponds to an encryption method and processing of an encryption program according to the first embodiment.

(Step S31: Acquisition Process)

The acquisition unit 311 of the encryption device 30 acquires a plaintext μ and an attribute x.

Specifically, the acquisition unit 311 accepts the plaintext μ and the attribute x inputted by a user or the like of the encryption device 30, via the communication interface 34. The plaintext μ is a message to be transmitted after being encrypted, and is the plaintext $\mu \in \{0, 1\}$. The attribute x is an attribute associated with a ciphertext and is an attribute $x \in \{0, 1\}^L$. The acquisition unit 311 writes the plaintext μ and the attribute x into the memory 32.

(Step S32: Encryption Process)

The encryption unit 312 of the encryption device 30 generates the ciphertext ct obtained by encrypting the plaintext μ with the attribute x set.

Specifically, the encryption unit 312 reads the public parameter pp from the public parameter storage unit 331 and reads the plaintext μ and the attribute x from the memory 32. The encryption unit 312 generates a matrix S, a matrix $E_A$, and an error vector $e_v$ as represented in Formula 26.

$$S \xleftarrow{U} \mathbb{Z}_q^{n \times M}, E_A \xleftarrow{R} \chi^{m \times M}, e_v \xleftarrow{R} \chi^M. \quad \text{[Formula 26]}$$

The encryption unit 312 generates a matrix $R_{i,j}$ for each integer i of $i \in \{0, 1, \ldots, L\}$ and each integer j of $j \in [M]$ as represented in Formula 27.

$$R_{i,j} \xleftarrow{U} \{0, 1\}^{m \times N} \quad \text{[Formula 27]}$$

The encryption unit 312 generates a matrix $E_i[j]$ for each integer i of $i \in \{0, 1, \ldots, L\}$ and each integer j of $j \in [M]$ as represented in Formula 28. Here, $E_i[j]$ and $E_A[j]$ represent j-th columns of the matrix $E_i$ and the matrix $E_A$, respectively.

$$E_i[j] := R_{i,j}^T E_A[j] \quad \text{[Formula 28]}$$

The encryption unit 312 generates a matrix C as represented in Formula 29, and generates a matrix $C_x$ as represented in Formula 30.

$$C := \begin{bmatrix} A^T \\ B_0^T \\ v^T \end{bmatrix} \cdot S + \begin{bmatrix} E_A \\ E_0 \\ e_v^T \end{bmatrix} + \mu(I_{m+N+1} \otimes g^T) \quad \text{[Formula 29]}$$

$$C_x := [\vec{B}_x - x\vec{G}]^T \cdot S + \begin{bmatrix} E_1 \\ \vdots \\ E_L \end{bmatrix} \quad \text{[Formula 30]}$$

The matrix C is set with the plaintext and is configured to be decryptable with the decryption key $sk_f$ corresponding to the policy f satisfied by the attribute x.

Here, Formula 31 indicates a tensor product.

$$\otimes \quad \text{[Formula 31]}$$

Further, Formula 32 holds.

$$\vec{G} := I_{m+N+1} \otimes g^T \quad \text{[Formula 32]}$$

The encryption unit 312 generates a matrix R and a matrix $E_F$ as represented in Formula 33.

$$R \xleftarrow{U} \mathbb{Z}_q^{n \times N}, E_F \xleftarrow{R} \chi^{(m+N+1) \times M} \quad \text{[Formula 33]}$$

The encryption unit 312 generates a matrix F as represented in Formula 34.

$$F := \begin{bmatrix} A^T \\ B^T \\ v^T \end{bmatrix} \cdot R + E_F + \mu(I_{m+N+1} \otimes g^T) \quad \text{[Formula 34]}$$

As represented in Formula 34, the plaintext μ and the matrix R that is a random number are set for the matrix F. The matrix F includes a matrix B instead of a matrix $B_0$ included in the matrix, and is configured not to be decrypted by the decryption key $sk_f$ corresponding to the policy f satisfied by the attribute x.

As represented in Formula 35, the encryption unit 312 generates a matrix $E^{(k)}_A$, a vector $e^{(k)}_v$, and a matrix $R^{(k)}_{i,j}$ for each integer i of i∈{0, 1, . . . , L}, each integer j of j∈[M], and each integer k of k∈[N].

$$E^{(k)}_A \xleftarrow{R} \chi^{m \times M}, e^{(k)}_v \xleftarrow{R} \chi^M, R^{(k)}_{i,j} \xleftarrow{U} \mathbb{Z}^{m \times N}_q \quad \text{[Formula 35]}$$

The encryption unit 312 generates a vector $E^{(k)}_i$ and a matrix $E^{(k)}$ as represented in Formula 36. Here, $E^{(k)}_i$[j] and the matrix $E^{(k)}_A$[j] represent j-th columns of the matrix $E^{(k)}_i$ and the matrix $E^{(k)}_A$, respectively.

$$E^{(k)}_i[j] := (R^{(k)}_{i,j})^T E^{(k)}_A[j],$$

$$E^{(k)} := [(E^{(k)}_A)^T \| (E^{(k)}_0)^T \| e^{(k)}_v]^T \quad \text{[Formula 36]}$$

The encryption unit 312 generates matrices $S^{(1)}, \ldots, S^{(N)}$ as represented in Formula 37.

$$S^{(1)}, \ldots, S^{(N)} \xleftarrow{U} \mathbb{Z}^{n \times M}_q \quad \text{[Formula 37]}$$

The encryption unit 312 generates a matrix D as represented in Formula 38, and generates a matrix $D^{(k)}_x$ as represented in Formula 39.

$$D := \left( I_N \otimes \begin{bmatrix} A^T \\ B^T_0 \\ v^T \end{bmatrix} \right) \cdot \begin{bmatrix} S^{(1)} \\ \vdots \\ S^{(N)} \end{bmatrix} + \begin{bmatrix} E^{(1)} \\ \vdots \\ E^{(N)} \end{bmatrix} + R \otimes g \otimes e_{m+N+1} \quad \text{[Formula 38]}$$

$$D^{(k)}_x := (\vec{B}_x - x\vec{G}) \cdot S^{(k)} + \begin{bmatrix} E^{(k)}_1 \\ \vdots \\ E^{(k)}_L \end{bmatrix} \quad \text{[Formula 39]}$$

That is, in the matrix D, the matrix R that is a random number included in the matrix F is encrypted.

The encryption unit 312 writes, into the memory 32, the ciphertext ct having the attribute x, the matrix C, the matrix $C_x$, the matrix F, the matrix D, and the matrix $D^{(k)}_x$ for each integer k of k∈[N], as encryption elements. That is, the ciphertext ct includes: the matrix C that is an encryption element in which the plaintext μ is set; the matrix $C_x$ that is an encryption element in which the attribute x is set; the matrix F that is an encryption element not to be decrypted by the decryption key $sk_f$ corresponding to the policy f satisfied by the attribute x, and in which the plaintext μ and the matrix R that is a random number are set; and the matrix D that is an encryption element in which the matrix R that is a random number is encrypted.

(Step S33: Output Process)

The output unit 313 of the encryption device 30 outputs the ciphertext ct.

Specifically, the output unit 313 reads the ciphertext ct from the memory 32. Then, the output unit 313 transmits the ciphertext ct to the homomorphic computation device 40 via the communication interface 34.

(Step S34: Ciphertext Acquisition Process)

The ciphertext acquisition unit 416 of the homomorphic computation device 40 receives the ciphertext ct transmitted by the output unit 313, via the communication interface 44. The ciphertext acquisition unit 416 writes the received ciphertext ct into the ciphertext storage unit 432.

That is, the encryption device 30 executes the Enc algorithm represented in Formulas 40 to 41, to generate the ciphertext ct.

$$Enc(\mu \in \{0, 1\}, x \in \{0, 1\}^L) \quad \text{[Formula 40]}$$

$$S \xleftarrow{U} \mathbb{Z}^{n \times M}_q, E_A \xleftarrow{R} \chi^{m \times M}, e_v \xleftarrow{R} \chi^M, \text{ for}$$

$$i \in \{0, \ldots, L\}; j = [M]$$

$$R_{i,j} \xleftarrow{U} \{0, 1\}^{m \times N}, E_i[j] := R^T_{i,j} E_A[j],$$

$$C := \begin{bmatrix} A^T \\ B^T_0 \\ v^T \end{bmatrix} \cdot S + \begin{bmatrix} E_A \\ E_0 \\ e^T_v \end{bmatrix} + \mu(I_{m+N+1} \otimes g^T),$$

$$C_x := [\vec{B}_x - x\vec{G}]^T \cdot S + \begin{bmatrix} E_1 \\ \vdots \\ E_L \end{bmatrix},$$

$$R \xleftarrow{U} \mathbb{Z}^{n \times N}_q, E_F \xleftarrow{R} \chi^{(m+N+1) \times M},$$

$$F := \begin{bmatrix} A^T \\ B^T \\ v^T \end{bmatrix} \cdot R + E_F + \mu(I_{m+N+1} \otimes g^T) \in \mathbb{Z}^{(m+N+1) \times M}_q,$$

$$\text{for } i = 1, \ldots, L; j = 1, \ldots, M; k = 1, \ldots, N \quad \text{[Formula 41]}$$

$$E^{(k)}_A \xleftarrow{R} \chi^{m \times M}, e^{(k)}_v \xleftarrow{R} \chi^M, R^{(k)}_{i,j} \xleftarrow{U} \mathbb{Z}^{m \times N}_q,$$

$$E^{(k)}_i[j] := (R^{(k)}_{i,j})^T E^{(k)}_A[j], E^{(k)} := \left[(E^{(k)}_A)^T \| (E^{(k)}_0)^T \| e^{(k)}_v \right]^T,$$

$$S^{(1)}, \ldots, S^{(N)} \xleftarrow{U} \mathbb{Z}^{n \times M}_q,$$

$$D := \left( I_N \otimes \begin{bmatrix} A^T \\ B^T_0 \\ v^T \end{bmatrix} \right) \cdot \begin{bmatrix} S^{(1)} \\ \vdots \\ S^{(N)} \end{bmatrix} + \begin{bmatrix} E^{(1)} \\ \vdots \\ E^{(N)} \end{bmatrix} + R \otimes g \otimes e_{m+N+1} \in$$

$$\mathbb{Z}^{(m+N+1)N \times M}_q,$$

$$D^{(k)}_x := (\vec{B}_x - x\vec{G}) \cdot S^{(k)} + \begin{bmatrix} E^{(k)}_1 \\ \vdots \\ E^{(k)}_L \end{bmatrix} \in \mathbb{Z}^{LN \times M}_q$$

$$\text{return } ct := (x, C, C_x, F, D, \{D^{(k)}_x\}_k).$$

Figure 9:
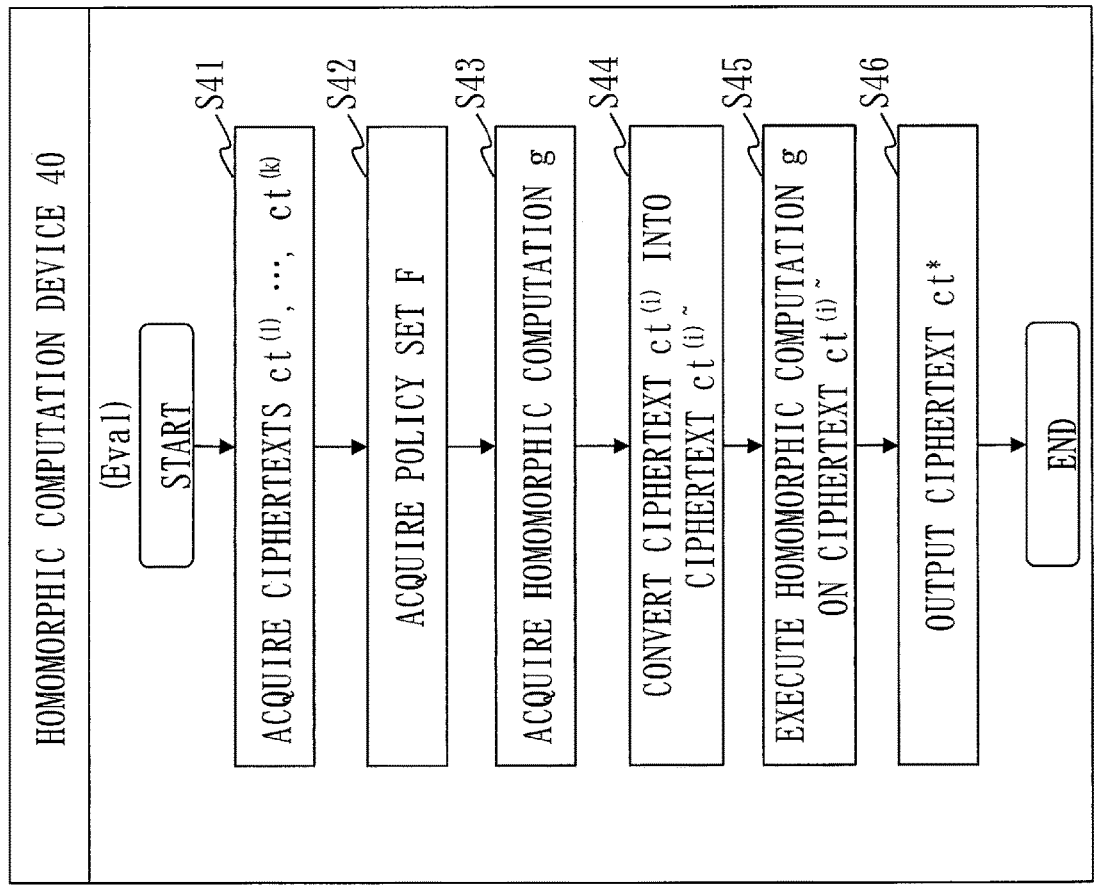
FIG. 9 is a flowchart of Eval processing according to the first embodiment.

With reference to FIG. 9, the Eval processing according to the first embodiment will be described.

The Eval processing is executed by the homomorphic computation device 40 in performing homomorphic computation on the ciphertext ct. The Eval processing according to the first embodiment corresponds to a homomorphic computation method and processing of a homomorphic computation program according to the first embodiment.

(Step S41: Ciphertext Acquisition Process)

The ciphertext acquisition unit 416 acquires ciphertexts $ct^{(1)}, \ldots, ct^{(k)}$ subject to computation. Here, k is an integer of 1 or more.

Specifically, the ciphertext acquisition unit 416 reads the ciphertexts $ct^{(1)}, \ldots, ct^{(k)}$ specified by a user or the like of the homomorphic computation device 40, via the communication interface 44 from the ciphertext storage unit 432. The ciphertext acquisition unit 416 writes the read ciphertexts $ct^{(1)}, \ldots, ct^{(k)}$ into the memory 42.

(Step S42: Policy Acquisition Process)

The policy acquisition unit 417 of the homomorphic computation device 40 acquires a policy set $F:=\{f_1, \ldots, f_d\}$, which is a set of policies. Here, d is an integer of 1 or more.

Specifically, the policy acquisition unit 417 accepts the policy set F inputted by a user or the like of the homomorphic computation device 40, via the communication interface 44. The policy acquisition unit 417 writes the accepted policy set F into the memory 42.

Note that, in order to perform homomorphic computation, a ciphertext $ct^{(i)}$ for each integer i of i=1, ..., k read out in step S41 needs to satisfy any of $f_1, \ldots, f_d$ included in the policy set F. In other words, it is necessary for the ciphertext $ct^{(i)}$ for each integer i of i=1, ..., k to be decryptable with the decryption key $sk_f$ associated with any of $f_1, \ldots, f_d$. That is, assuming that an attribute that has been set for the ciphertext $ct^{(i)}$ for each integer i of i=1, ..., k is an attribute $x_i$, $f_j(x_i)=0$ needs to be satisfied for a certain $j \in [d]$, for each integer i of i=1, ..., k.

(Step S43: Computation Acquisition Process)

The computation acquisition unit 418 of the homomorphic computation device 40 acquires homomorphic computation g to be executed.

Specifically, the computation acquisition unit 418 accepts the homomorphic computation g inputted by a user or the like of the homomorphic computation device 40, via the communication interface 44. The computation acquisition unit 418 writes the accepted homomorphic computation g into the memory 42.

(Step S44: Ciphertext Conversion Process)

The ciphertext conversion unit 412 of the homomorphic computation device 40 converts the ciphertext $ct^{(i)}$ for each integer i of i=1, ..., k into a ciphertext $ct^{(i)\sim}:=(C^\sim, F^\sim, D^\sim)$.

Specifically, the ciphertext conversion unit 412 first executes an Apply algorithm and then executes an Expansion algorithm on the ciphertext $ct^{(i)}$ for each integer i of i=1, ..., k as a target. However, the Apply algorithm is executed only for the ciphertext $ct^{(i)}$ that has never been subjected to homomorphic computation. That is, the Apply algorithm is executed in a case where the ciphertext $ct^{(i)}$ is generated by the encryption device 30 and is the ciphertext ct outputted in step S33 of FIG. 8, while the Apply algorithm is not executed in a case where the ciphertext $ct^{(i)}$ is the ciphertext ct* outputted in step S46 to be described later. In a case where the ciphertext $ct^{(i)}$ is the ciphertext ct* outputted in step S46 to be described later, only the Expansion algorithm is executed.

Here, to simplify the expression, the target ciphertext $ct^{(i)}$ is written as a ciphertext ct, and the ciphertext $ct^{(i)\sim}$ obtained by converting the ciphertext $ct^{(i)}$ is written as a ciphertext $ct^\sim$. Further, a policy $f_j$ satisfied by the target ciphertext $ct^{(i)}$ is written as a policy f.

The Apply algorithm will be described.

The ciphertext conversion unit 412 calculates a matrix H as represented in Formula 42.

$$H := \text{EvRelation}(f, x, \vec{B}_x) \quad \text{[Formula 42]}$$

The EvRelation algorithm is described in Non Patent Literature 2.

The ciphertext conversion unit 412 generates a matrix $C_f := H^T C_x$. The ciphertext conversion unit 412 generates a matrix $C_{\hat{f}}$ as represented in Formula 43.

$$C_{\hat{f}} := C + \begin{bmatrix} 0_{m \times M} \\ C_f \\ 0_{1 \times M} \end{bmatrix} \quad \text{[Formula 43]}$$

For each integer i of $i \in [k]$, the ciphertext conversion unit 412 generates a matrix $D^{(i)}_f$ as represented in Formula 44.

$$D^{(i)}_f := H^T D^{(i)}_x \quad \text{[Formula 44]}$$

The ciphertext conversion unit 412 generates a matrix $D_f$ as represented in Formula 45.

$$D_f [0_{M \times m} \| (D^{(1)}_f)^T \oplus 0_M \| \ldots \| 0_{M \times m} \| (D^{(N)}_f)^T \| 0_M ]^T \quad \text{[Formula 45]}$$

The ciphertext conversion unit 412 generates a matrix $D_{\hat{f}} := D_f + D$.

That is, the ciphertext conversion unit 412 executes the Apply algorithm represented in Formula 46.

$$\text{[Formula 46]}$$

$$dMTHABE.\text{ApplyF}_{pp}(ct, f \in \mathcal{F})$$

$$H := \text{EvRelation}(f, x, \vec{B}_x),$$

$$C_f := H^T C_x,$$

$$C_{\hat{f}} := C + \begin{bmatrix} 0_{m \times M} \\ C_f \\ 0_{1 \times M} \end{bmatrix},$$

$$D^{(i)}_f := H^T D^{(i)}_x \in \mathbb{Z}_q^{N \times M},$$

$$D_f := [0_{M \times m} \| (D^{(1)}_f)^T \| 0_M \| \ldots \| 0_{M \times m} \| (D^{(N)}_f)^T \| 0_M ]^T,$$

$$D_{\hat{f}} := D_f + D,$$

$$\text{return } C_{\hat{f}}, F, D_{\hat{f}}.$$

The Expansion algorithm will be described.

Here, when the target ciphertext $ct^{(i)}$ is the ciphertext $ct^* := (C^*, F^*, D^*)$ outputted in step S46 to be described later, $C_{\hat{f}} := C^*$, $F := F^*$, and $D_{\hat{f}} := D^*$ are set.

The ciphertext conversion unit 412 sets the matrix F as a matrix $F^\sim$ as it is.

The ciphertext conversion unit 412 generates a matrix $D^\sim$ as represented in Formula 47.

$$D^\sim := \left( I_N \otimes \begin{bmatrix} I_{n'} \\ 0_{(m+N+1) \times n'} \end{bmatrix} \right) \cdot D_{\hat{f}} \quad \text{[Formula 47]}$$

The ciphertext conversion unit 412 generates a matrix $C^\sim$ as represented in Formula 48.

$$C^\sim := \begin{bmatrix} C_{\hat{f}} & X \\ 0 & F^\wedge \end{bmatrix} \quad \text{[Formula 48]}$$

Here, a matrix X is as represented in Formula 49.

$$X := (s \otimes I_n) \cdot D_{\hat{f}} \quad \text{[Formula 49]}$$

Further, a matrix s is as represented in Formula 50.

$$s := (I_n \otimes g^{-T})((B_f + B_0 - B) r'_f) \in \{0, 1\}^N \quad \text{[Formula 50]}$$

Note that the vector $r'_f \in \{0, 1\}^N$ is a vector obtained by querying f to a random oracle. That is, the vector $r'_f$ is a random vector. Further, $B_f$ is as represented in Formula 21.

The ciphertext conversion unit 412 writes the ciphertext $ct^\sim := (C^\sim, F^\sim, D^\sim)$ into the memory 42.

That is, the ciphertext conversion unit 412 executes the Expansion algorithm represented in Formula 51.

$$\text{Expansion}(C_f^\wedge, F, D_f^\wedge) \qquad \text{[Formula 51]}$$

$$F^\sim := F,$$

$$D^\sim := \left(I_N \otimes \begin{bmatrix} I_{n'} \\ 0_{(m+N+1) \times n'} \end{bmatrix}\right) \cdot D_f^\wedge,$$

$$r'_f \in \{0,1\}^N, B_f := \text{Eval}(\vec{B}_x, f),$$

$$s := (I_n \otimes g^{-T})((B_f - B)r'_f) \in \{0,1\}^N,$$

$$X := (s \otimes I_{n'}) \cdot D_f^\wedge,$$

$$C^\sim := \begin{bmatrix} C_f^\wedge & X \\ 0 & F^\wedge \end{bmatrix}$$

$$\text{return } C^\sim, F^\sim, D^\sim.$$

(Step S45: Homomorphic Computation Process)

The homomorphic computation unit 413 of the homomorphic computation device 40 executes the homomorphic computation g on the ciphertext $ct^{(i)\sim}$ for each integer i of i=1, . . . , k, to generate the ciphertext ct*:=(C*, F*, D*).

Specifically, the homomorphic computation unit 413 reads the ciphertext $ct^{(i)\sim}$ for each integer i of i=1, . . . k. Then, with the ciphertext $ct^{(i)\sim}$ for each integer i of i=1, . . . , k as an input, the homomorphic computation unit 413 executes the homomorphic computation g in accordance with the homomorphic computation method described in "3.2 Homomorphic Operations" of Non Patent Literature 3, to generate the ciphertext ct*. The homomorphic computation unit 413 writes the generated ciphertext ct* into the memory 42.

As a specific example, a case of performing homomorphic addition on two ciphertexts $ct^{(1)\sim}:=(C_1, F_1, D_1)$ and $ct^{(2)\sim}:=(C_2, F_2, D_2)$ will be described. In this case, the homomorphic computation unit 413 calculates each encryption element such as $C^*:=C_1+C_2$, $F^*:=F_1+F_2$, and $D^*:=D_1+D_2$.

Further, as a specific example, a case of performing homomorphic multiplication on two ciphertexts $ct^{(1)\sim}:=(C_1, F_1, D_1)$ and $ct^{(2)\sim}:=(C_2, F_2, D_2)$ will be described. In this case, the homomorphic computation unit 413 calculates each encryption element as represented in Formula 52.

$$C^*:=C_1 \cdot (I_n \otimes g^{-T})(C_2),$$

$$F^*:=F_1 \cdot (I_{m+N+1} \otimes g^{-T})(F_2),$$

$$D^*:=D_1 \cdot (I_{m+N+1} \otimes g^{-T})(F_2) + (I_N \otimes C_1) \cdot (I_{nN} \otimes g^{-T})(D_2) \qquad \text{[Formula 52]}$$

(Step S46: Output Process)

The output unit 414 of the homomorphic computation device 40 outputs the ciphertext ct*.

Specifically, the output unit 414 reads the ciphertext ct* from the memory 42. Then, the output unit 414 writes the ciphertext ct* into the ciphertext storage unit 432.

That is, the homomorphic computation device 40 executes the Evaluation algorithm represented in Formula 53 to generate the ciphertext ct*.

$$\text{Evaluation}(ct^{(1)}, \ldots, ct^{(k)}, f_1, \ldots, f_d \in \mathcal{F}, g \in \mathcal{G}) \qquad \text{[Formula 53]}$$

$$j \in [d] \text{ satisfy } f_j(x_i) = 0 \text{ for } i \in [k],$$

$$(C_{f_j,i}^\wedge, F_{f_j,i}, D_{f_j,i}^\wedge) := \text{Apply}(ct^{(i)}, f_j) \text{ for } i \in [k],$$

$$(C_{f_j,i}^\sim, F_{f_j,i}^\sim, D_{f_j,i}^\sim) := \text{Expansion}(C_{f_j,i}^\wedge, F_{f_j,i}, D_{f_j,i}^\wedge),$$

$$(C^*, F^*, D^*) := \text{H.Op}\left(\{C_{f_j,i}^\sim, F_{f_j,i}^\sim, D_{f_j,i}^\sim\}_{i \in [k]}\right),$$

$$\text{return } ct^* := [C^*, F^*, D^*].$$

Note that the H.Op algorithm is a computation algorithm of homomorphic computation described in Non Patent Literature 3.

Figure 10:
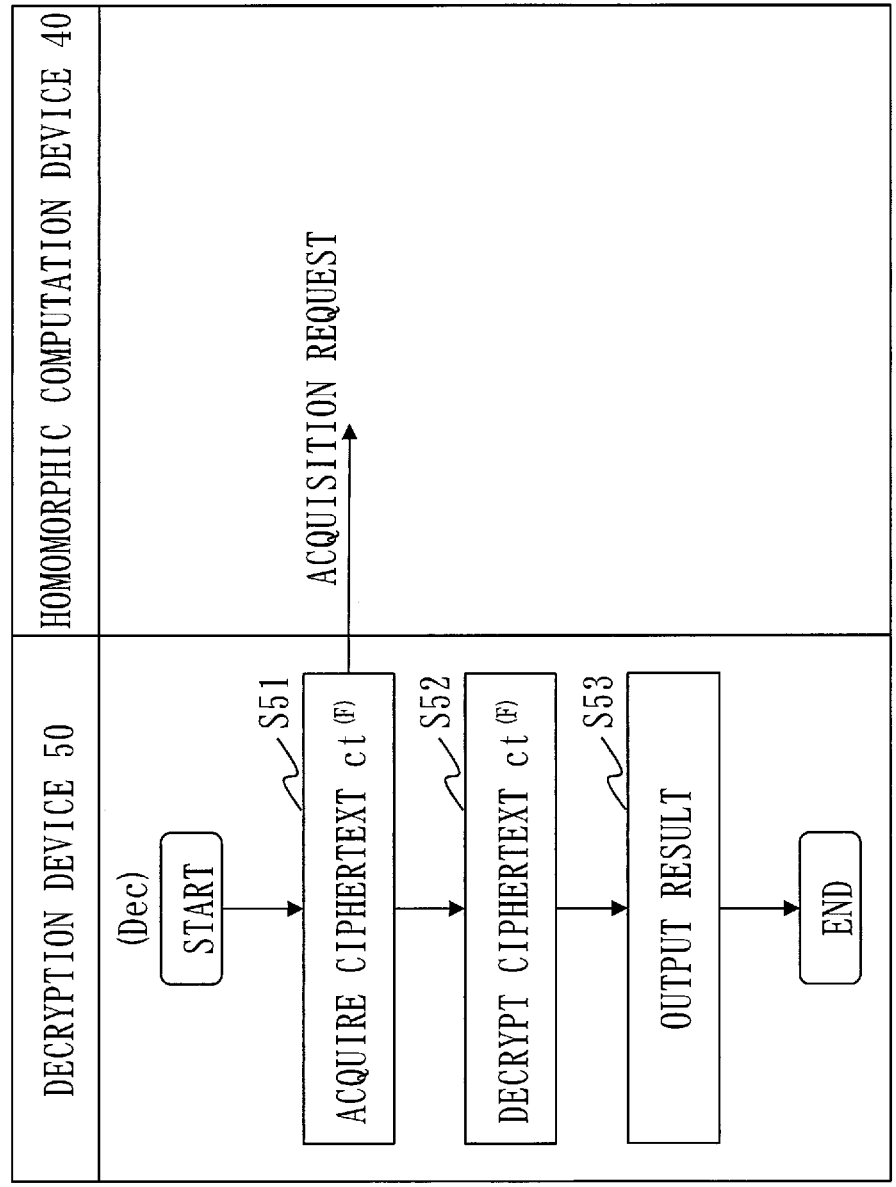
FIG. 10 is a flowchart of Dec processing according to the first embodiment.

With reference to FIG. 10, the Dec processing according to the first embodiment will be described.

The Dec processing is mainly executed by the decryption device 50 in decrypting the ciphertext ct. The Dec processing according to the first embodiment corresponds to a decryption method and processing of a decryption program according to the first embodiment.

(Step S51: Acquisition Process)

The acquisition unit 511 of the decryption device 50 acquires a ciphertext $ct^{(F)}:=(C^\wedge_F, F, D^\wedge_F)$ to be decrypted.

Specifically, the acquisition unit 511 transmits an acquisition request for the ciphertext $ct^{(F)}$ to the homomorphic computation device 40 via the communication interface 54. Upon receiving the acquisition request, the output unit 414 of the homomorphic computation device 40 reads the requested ciphertext $ct^{(F)}$ from the ciphertext storage unit 432. At this time, in a case where the ciphertext $ct^{(F)}$ is the ciphertext et outputted in step S33 of FIG. 8, the ciphertext conversion unit 412 of the homomorphic computation device 40 executes the above-described Apply algorithm to convert the ciphertext ct into ciphertext $ct^{(F)}:=(C^\wedge_F, F, D^\wedge_F)$. Further, in a case where the ciphertext $ct^{(F)}$ is the ciphertext ct*:=(C*, F*, D*) outputted in step S46 of FIG. 9, the ciphertext conversion unit 412 of the homomorphic computation device 40 converts into the ciphertext $ct^{(F)}:=(C^\wedge_F:=C^*, F:=F^*, D^\wedge_F:=D^*)$. Then, the output unit 414 transmits the converted ciphertext $ct^{(F)}$ to the decryption device 50 via the communication interface 44. The acquisition unit 511 receives the ciphertext $ct^{(F)}$ transmitted from the homomorphic computation device 40. The acquisition unit 511 writes the received ciphertext $ct^{(F)}$ into the memory 52.

The ciphertext $ct^{(F)}$ means that it is a ciphertext that can be decrypted by the decryption keys $sk_{f1}, \ldots, sk_{fd}$ associated with the policy set $F:=\{f_1, \ldots, f_d\}$.

(Step S52: Decryption Process)

The decryption unit 512 of decryption device 50 decrypts the ciphertext $ct^{(F)}$ with decryption key $sk_{f1}:=r_{f1}, \ldots, sk_{fd}:=r_{fd}$, to calculate a value $\tilde{\mu}$.

Specifically, the decryption unit 512 acquires a matrix $r'_{fj}:=O(A, f_j)$ by querying to a random oracle for each integer j of j∈[d]. The decryption unit 512 concatenates the decryption key $sk_{fj}$ for each integer j of j∈[d] as represented in Formula 54, to generate a decryption key $r_F^T$.

$$r_F^T:=[r_{f1}^T \| r'_{f1}^T \| 1 \| \ldots \| r_{fd}^T \| r'_{fd}^T \| 1] \qquad \text{[Formula 54]}$$

The decryption unit 512 calculates a vector c as represented in Formula 55.

$$c:=r_F^T C_F \qquad \text{[Formula 54]}$$

The decryption unit 512 calculates the value $\tilde{\mu}$ as represented in Formula 56.

$$\tilde{\mu}:=c^T \cdot (I_{d(m+N+1)} \otimes g^{-T})(u) \qquad \text{[Formula 56]}$$

Here, the vector u is as represented in Formula 57.

$$u^T:=(0, \ldots, 0, \lfloor q/2 \rfloor) \in \mathbb{Z}^{1 \times d(m+N+1)} \qquad \text{[Formula 57]}$$

(Step S53: Output Process)

The output unit 513 of the decryption device 50 outputs 0 when an absolute value of the value μ~ is less than q/4, or otherwise outputs 1.

That is, the decryption device 50 executes a Dec algorithm represented in Formula 58, to decrypt the ciphertext ct$^{(F)}$.

$$\text{Dec}(ct^{(F)}:=(C_F, F, D_F), sk_{f1}, \ldots, sk_{fd})$$

$$r'_{fj}:=O(A, f_j) \text{ for } j=1, \ldots, d,$$

$$r_F^T:=[r_{f1}^T \| r'_{f1}{}^T \| 1 \| \ldots \| r_{fd}^T \| r'_{fd}{}^T \| 1],$$

$$c:=r_F^T C_F,$$

$$u^T:=(0, \ldots, 0, \lfloor q/2 \rfloor) \in \mathbb{Z}^{1 \times d(m+N+1)},$$

$$\tilde{\mu}:=c^T \cdot (I_{d(m+N+1)} \otimes g^{-T})(u) \qquad \text{[Formula 58]}$$

return if |μ~|<q/4 then 0, otherwise 1.

*Effect of First Embodiment*

As described above, in the encryption system 10 according to the first embodiment, the matrix C that is an encryption element is converted into the matrix C~ that is an encryption element, by using the encryption element F. This makes it possible to perform homomorphic computation without associating an element in the encryption element C with the policy set F. Therefore, it becomes possible to perform flexible homomorphic computation again by using the ciphertext ct* as an input.

The reason why the effect of enabling flexible homomorphic computation again with the ciphertext ct* as an input is obtained will be described.

Suppose that a ciphertext ct$^{(f)}$:=(C^$_f$, F, D^$_f$) is obtained as a result of execution of the Apply algorithm described in step S44 of FIG. 9 with the ciphertext ct:=(x, C, C$_x$, F, D, {D$^{(k)}_x$}$_k$) generated by the encryption device 30 as an input.

At this time, the ciphertext ct$^{(f)}$ satisfies relationships (1) to (3) represented in Formula 59 for a decryption key t∈Z$_q^{m+N+1}$ and a small random matrix R∈Z$_q^{n \times M}$.

$$(1)\ tC_f^\wedge \approx \mu(t \otimes g^T) \qquad \text{[Formula 59]}$$

$$(2)\ F \approx \begin{bmatrix} A^T \\ B^T \\ v^T \end{bmatrix} \cdot R + \mu(I_{m+N+1} \otimes g^T)$$

$$(3)\ (I_N \otimes t_f) \cdot D_f^\wedge = R \otimes g$$

Suppose that the ciphertext ct~:=(C~, F~, D~) is obtained as a result of execution of the Expansion algorithm described in step S44 of FIG. 9 with the ciphertext ct$^{(f)}$ as an input. At this time, the ciphertext ct~ is held in a state of satisfying the relationships (1) to (3) represented in Formula 59, as will be described later, for a decryption key t~:=[t∥t$_f$] obtained by concatenating a decryption key t$_f$ with the decryption key t, and for a random matrix R~.

The matrix F becomes the matrix F~ as it is. Therefore, the random matrix R becomes the random matrix R~ as it is. Therefore, the relationship represented in (2) of Formula 59 is satisfied.

The matrix ID~ is generated as represented in Formula 47. At this time, the relationship represented in Formula 60 is established.

$$(I_N \otimes \tilde{t}^T) \cdot D^\sim = (I_N \otimes t^T) \cdot D_f^\wedge \qquad \text{[Formula 60]}$$

$$= R \otimes g$$

Therefore, the relationship of (3) of Formula 59 is satisfied.

The matrix C~ is generated as represented in Formula 48. At this time, with a configuration of the matrix X, the relationship of Formula 61 is established.

$$t^T X = t^T \cdot (s^T \otimes I_{n'}) \cdot D_f^\wedge \qquad \text{[Formula 61]}$$

$$= (s^T \otimes 1) \cdot (I_N \otimes t^T) \cdot D_f^\wedge$$

$$\approx s^T \cdot R \otimes g$$

$$= s^T \cdot (I_n \otimes g)(R \otimes 1)$$

$$= r_f'^T \cdot (B_f^T - B^T) \cdot R$$

Therefore, the relationship of Formula 62 is established.

$$t^T X + t_f F \approx r_f'^T \cdot (B_f^T - B^T) \cdot R + [r_f^T \| r_f'^T \| 1] \begin{bmatrix} A^T \\ B^T \\ v^T \end{bmatrix} \cdot R + \qquad \text{[Formula 62]}$$

$$\mu(t_f^T \otimes g^T) = [r_f^T \| r_f'^T \| 1] \begin{bmatrix} A^T \\ B_f^T \\ v^T \end{bmatrix} \cdot R +$$

$$\mu(t_f^T \otimes g^T) = \mu(t_f^T \otimes g^T)$$

As a result, the relationship of Formula 63 is established, and the relationship of (1) of Formula 59 is satisfied.

$$\tilde{t}^T C^\sim \approx \mu(\tilde{t}^T \otimes g^T) \qquad \text{[Formula 63]}$$

Suppose that the ciphertext ct*:=(C*, F*, D*) is obtained as a result of execution of the homomorphic computation g described in step S45 of FIG. 9 with the ciphertext ct~ as an input. At this time, as described in Non Patent Literature 3, the ciphertext ct* is also held in a state of satisfying the relationships (1) to (3) represented in Formula 59.

That is, the ciphertext ct* obtained as a result of execution of the homomorphic computation g holds the relationship satisfied by the ciphertext ct$^{(f)}$ obtained as a result of execution of the Apply algorithm with the ciphertext ct generated by the encryption device 30 as an input. Therefore, a state of satisfying this relationship can be obtained even when the Expansion algorithm is executed with the ciphertext ct* obtained as a result of execution of the homomorphic computation g as an input, instead of the ciphertext ct generated by the encryption device 30. As a result, flexible homomorphic computation can also be performed for the ciphertext ct* obtained as a result of execution of the homomorphic computation g, similarly to the ciphertext ct generated by the encryption device 30.

That is, in step S44 of FIG. 9, with the matrix F that is an encryption element and the matrix D that is an encryption element, the ciphertext conversion unit 412 converts the matrix C and the matrix C$_x$ that are encryption elements included in the ciphertext ct acquired by the ciphertext acquisition unit 416, into the matrix C~ that is an encryption element decryptable with the decryption key sk$_F$ corresponding to the policy set F acquired by the policy acquisition unit 417. In addition, the ciphertext conversion unit 412 also converts the matrix D to the matrix D~. As a result, the ciphertext conversion unit 412 converts the ciphertext ct into the ciphertext ct~.

That is, the ciphertext conversion unit 412 converts the matrix C that is an encryption element in which the plaintext μ is set, and the matrix $C_x$ that is an encryption element in which the attribute x is set, by using the matrix F that is an encryption element not to be decrypted with the decryption key $sk_f$ corresponding to the policy f satisfied by the attribute x and in which the plaintext μ and the matrix R that is a random number are set, and using the matrix D that is an encryption element in which the matrix R that is a random number is encrypted. In this way, by using the matrix F and the matrix D, the ciphertext conversion unit 412 makes it possible to perform the homomorphic computation while maintaining the relationship established between the ciphertext, and the decryption key and a random number R.

\*\*\*Other Configuration\*\*\*

<Modification 1>

In the first embodiment, the functional components of the key generation device 20, the encryption device 30, the homomorphic computation device 40, and the decryption device 50 are realized by software. However, as Modification 1, the functional components may be realized by hardware. With regard to Modification 1, points different from the first embodiment will be described.

Figure 11:
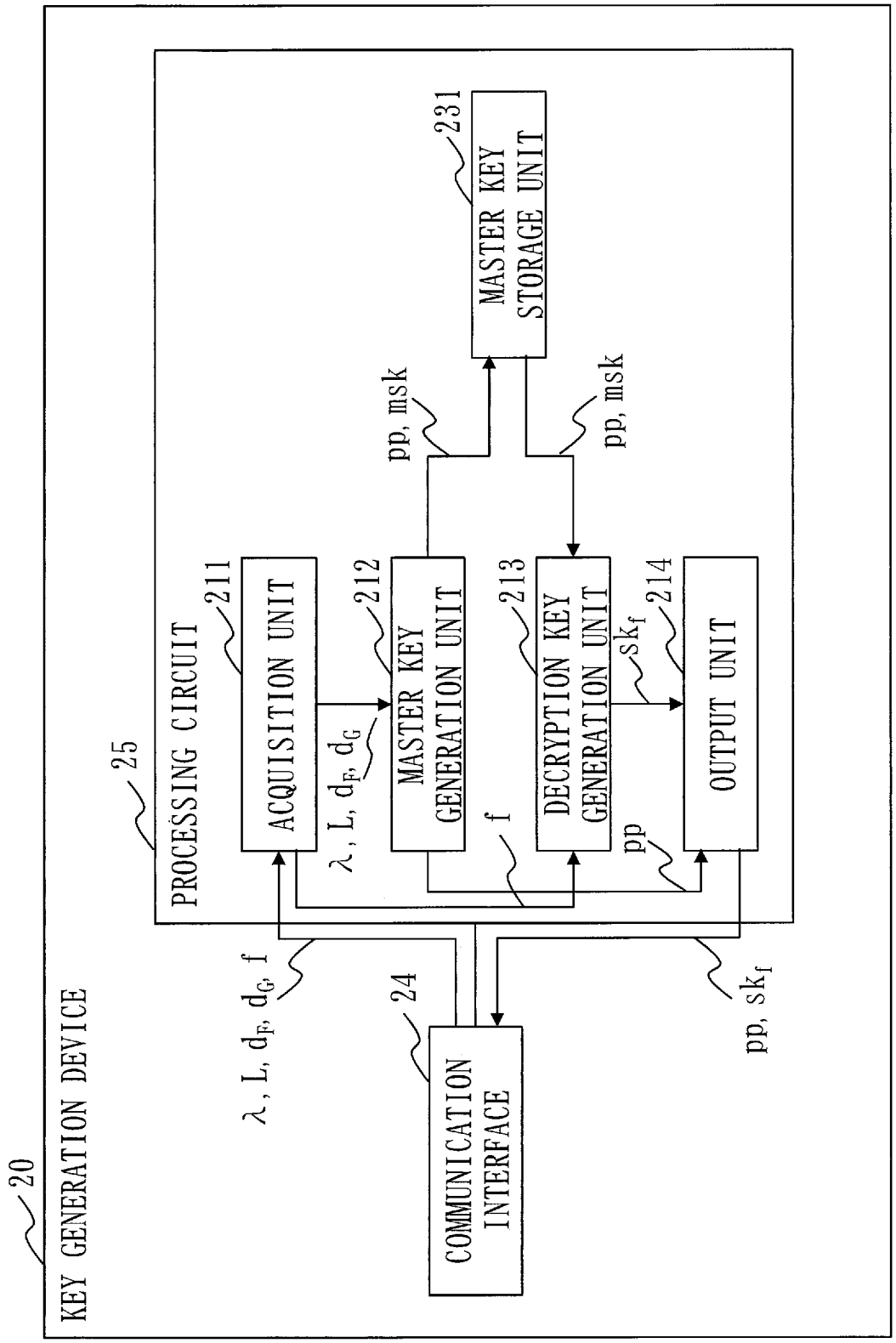
FIG. 11 is a configuration diagram of a key generation device 20 according to Modification 1.

With reference to FIG. 11, a configuration of a key generation device 20 according to Modification 1 will be described.

In a case where a function is realized by hardware, the key generation device 20 includes a processing circuit 25, instead of the processor 21, the memory 22, and the storage 23. The processing circuit 25 is a dedicated electronic circuit to realize functional components of the key generation device 20 and functions of the memory 22 and the storage 23.

Figure 12:
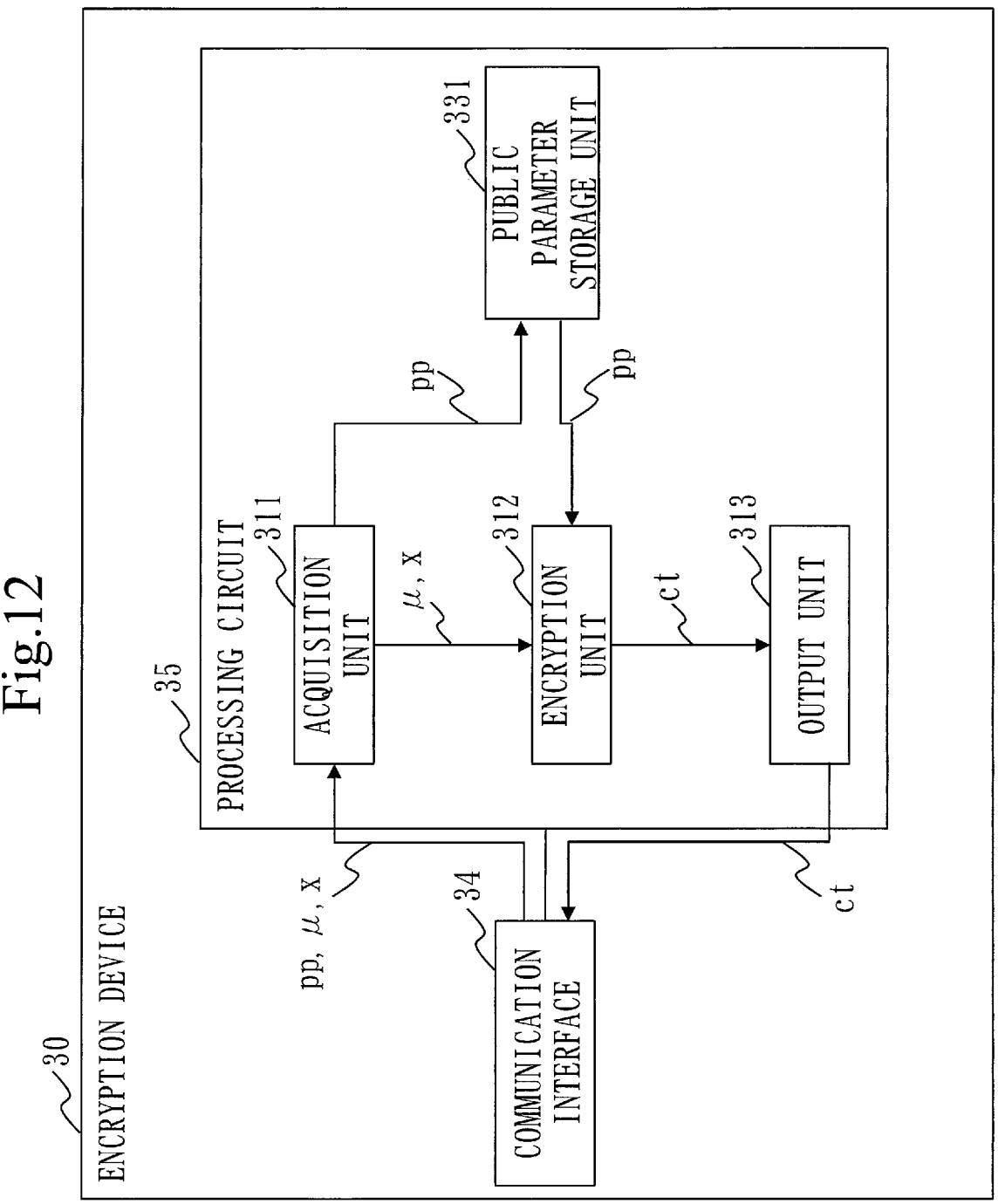
FIG. 12 is a configuration diagram of an encryption device 30 according to Modification 1.

With reference to FIG. 12, a configuration of an encryption device 30 according to Modification 1 will be described.

In a case where a function is realized by hardware, the encryption device 30 includes a processing circuit 35, instead of the processor 31, the memory 32, and the storage 33. The processing circuit 35 is a dedicated electronic circuit to realize functional components of the encryption device 30 and functions of the memory 32 and the storage 33.

Figure 13:
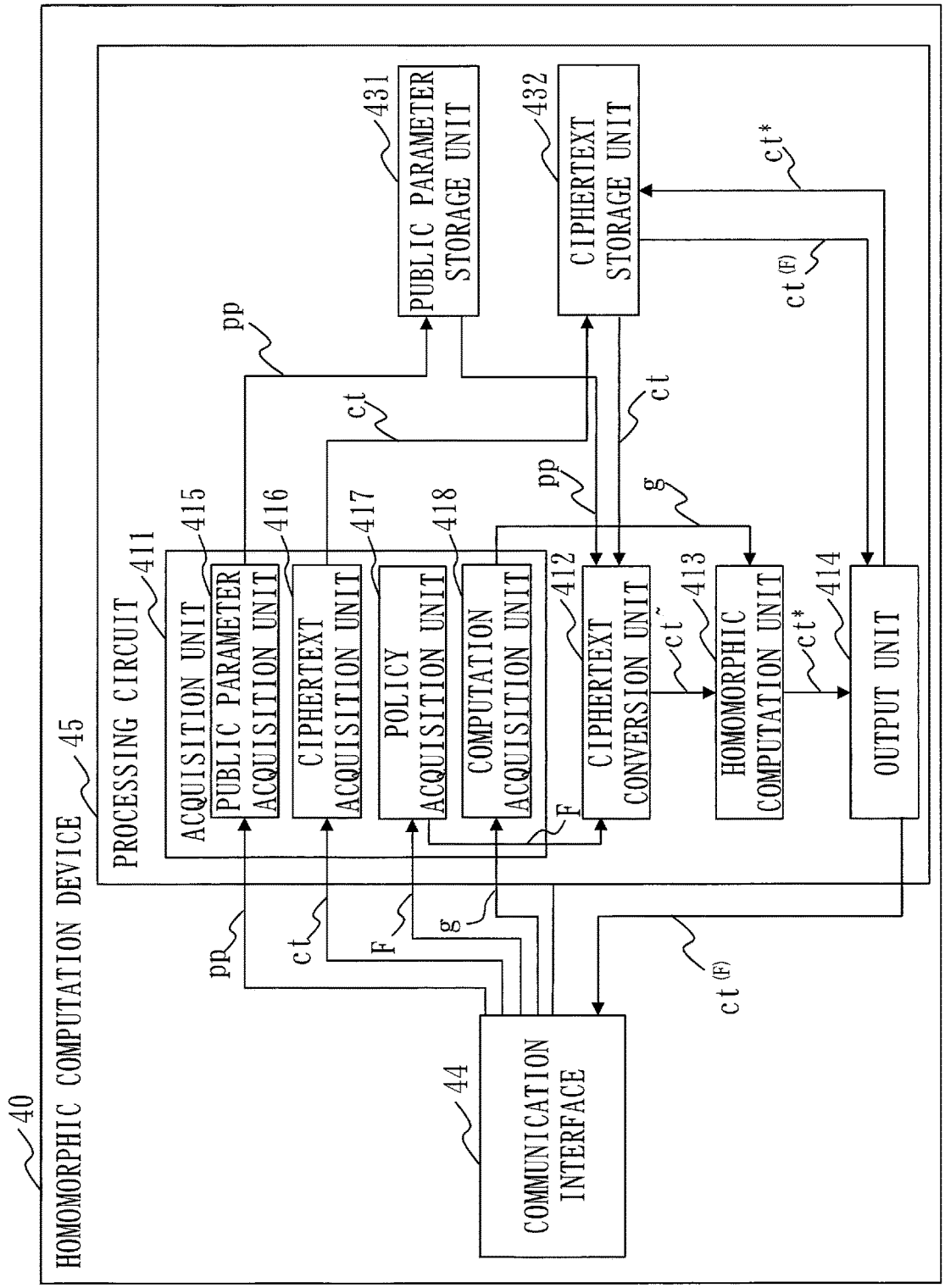
FIG. 13 is a configuration diagram of a homomorphic computation device 40 according to Modification 1.

Referring to FIG. 13, a configuration of a homomorphic computation device 40 according to Modification 1 will be described.

In a case where a function is realized by hardware, the homomorphic computation device 40 includes a processing circuit 45, instead of the processor 41, the memory 42, and the storage 43. The processing circuit 45 is a dedicated electronic circuit to realize functional components of the homomorphic computation device 40 and functions of the memory 42 and the storage 43.

Figure 14:
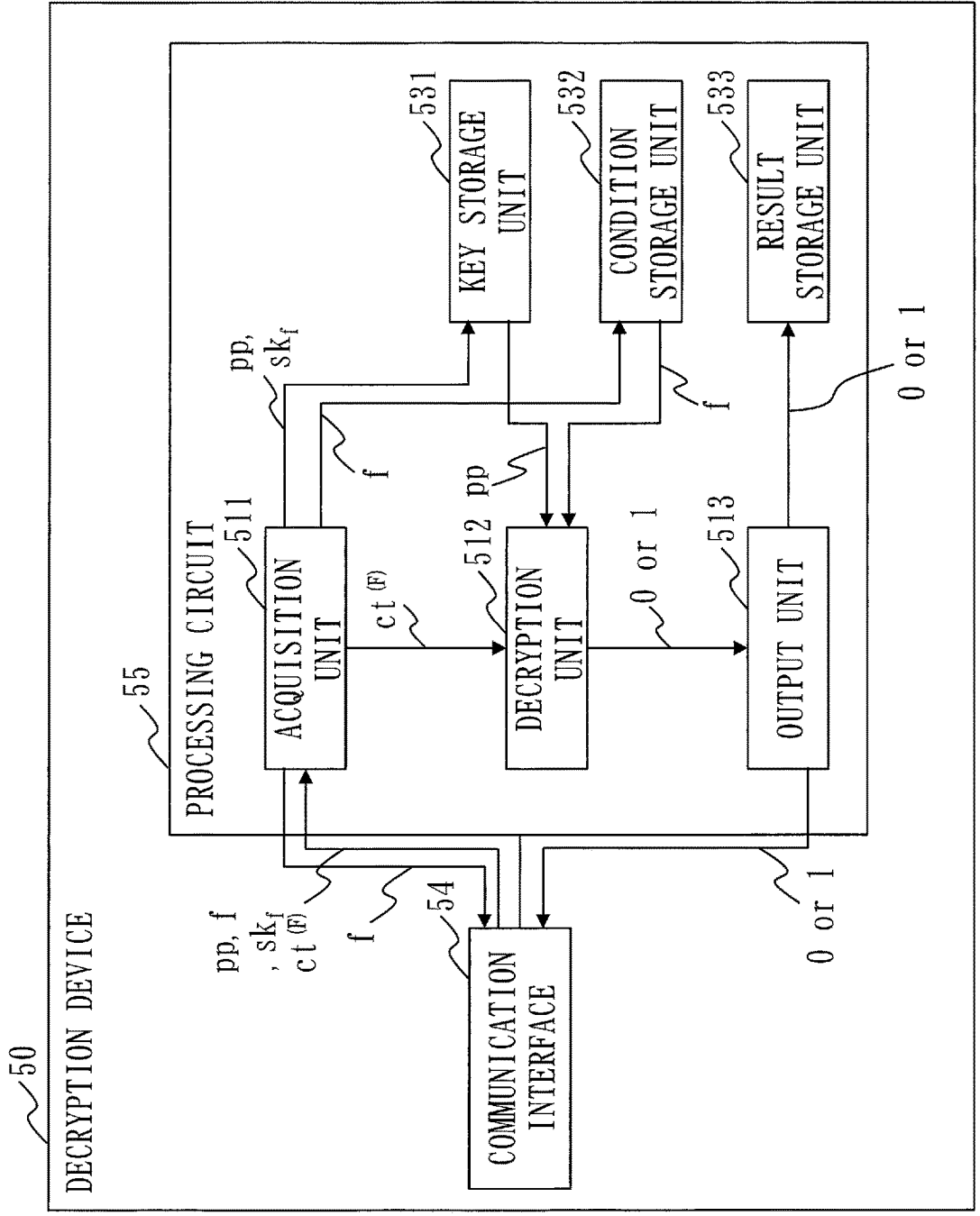
FIG. 14 is a configuration diagram of a decryption device 50 according to Modification 1.

With reference to FIG. 14, a configuration of a decryption device 50 according to Modification 1 will be described.

In a case where a function is realized by hardware, the decryption device 50 includes a processing circuit 55, instead of the processor 51, the memory 52, and the storage 53. The processing circuit 55 is a dedicated electronic circuit to realize functional components of the decryption device 50 and functions of the memory 52 and the storage 53.

For the processing circuits 25, 35, 45, and 55, a single circuit, a composite circuit, a programmed processor, a parallel programmed processor, a logic IC, a gate array (GA), an application specific integrated circuit (ASIC), or a field-programmable gate array (FPGA) is assumed.

A function of each functional component of the key generation device 20 may be realized by one processing circuit 25, or a function of each functional component may be distributed to a plurality of processing circuits 25, to be realized. Similarly, for each of the encryption device 30, the homomorphic computation device 40, and the decryption device 50, a function of each functional component may be realized by one processing circuit 35, 45, or 55, or a function of each functional component may be distributed to a plurality of processing circuits 35, 45, or 55, to be realized.

<Modification 2>

In Modification 2, some function may be realized by hardware, and other function may be realized by software. That is, in each functional component, some function may be realized by hardware, and other function may be realized by software.

The processors 21, 31, 41, and 51, the memories 22, 32, 42, and 52, the storages 23, 33, 43, and 53, and the processing circuits 25, 35, 45, and 55 are collectively referred to as "processing circuitry". That is, a function of each functional component is realized by the processing circuitry.

\*\*\*Description of Notation\*\*\*

When A is a random variable value or distribution, Formula 64 represents random selection of y from A in accordance with distribution of A. That is, in Formula 64, y is a random number.

$$y \xleftarrow{R} A \qquad \text{[Formula 64]}$$

When A is a set, Formula 65 represents uniform selection of y from A. That is, in Formula 65, y is a uniform random number.

$$y \xleftarrow{U} A \qquad \text{[Formula 65]}$$

Formula 66 represents that y is a set defined by z, or that y is a set into which z is assigned.

$$y := z \qquad \text{[Formula 66]}$$

When a is a constant, Formula 67 represents that a machine (algorithm) A outputs a for an input x.

$$A(x) \rightarrow a \qquad \text{[Formula 67]}$$

$Z_q$ represents a group of integers of an order q. Further, $y \in Z_q^v$ indicates that y is a vector with v elements on $Z_q$. Further, $y \in Z_q^{v \times w}$ indicates that y is a matrix of v rows and w columns with elements on $Z_q$.

REFERENCE SIGNS LIST

10: encryption system, 20: key generation device, 21: processor, 22: memory, 23: storage, 24: communication interface, 25: processing circuit, 211: acquisition unit, 212: master key generation unit, 213: decryption key generation unit, 214: output unit, 231: master key storage unit, 30: encryption device, 31: processor, 32: memory, 33: storage, 34: communication interface, 35: processing circuit, 311: acquisition unit, 312: encryption unit, 313: output unit, 331: public parameter storage unit, 40: homomorphic computation device, 41: processor, 42: memory, 43: storage, 44:

communication interface, 45: processing circuit, 411: acquisition unit, 412: ciphertext conversion unit, 413: homomorphic computation unit, 414: output unit, 415: public parameter acquisition unit, 416: ciphertext acquisition unit, 417: policy acquisition unit, 418: computation acquisition unit, 431: public parameter storage unit, 432: ciphertext storage unit, 50: decryption device, 51: processor, 52: memory, 53: storage, 54: communication interface, 55: processing circuit, 511: acquisition unit, 512: decryption unit, 513: output unit, 531: key storage unit, 532: condition storage unit, 533: result storage unit, $\lambda$: security parameter, pp: public parameter, msk: master secret key, $sk_f$: decryption key, $\mu$: plaintext, x: attribute, ct, $ct^{(F)}$, $ct^\sim$, $ct^*$: ciphertext, F: policy set, g: homomorphic computation.

The invention claimed is:

1. A homomorphic computation device comprising:
processing circuitry to:
acquire a ciphertext ct including
an encryption element C in which a plaintext $\mu$ is encrypted, the encryption element C being decryptable by a decryption key $sk_f$ corresponding to a policy f satisfied by the attribute x,
an encryption element $C_x$ created using an attribute x, and
an encryption element F in which the plaintext $\mu$ is encrypted, the encryption element F only being decryptable by a different key than the decryption key skf corresponding to the policy f satisfied by the attribute x, the different key corresponding to a policy, which is different than the policy f, and which is satisfied by an attribute different than the attribute x;
acquire a policy set F that is a set of policies including the policy f and the policy different than the policy f;
convert the ciphertext ct into a ciphertext ct~ by converting, with the encryption element F, the encryption element Cx included in the acquired ciphertext ct, into an encryption element C~ that can be decrypted with a decryption key skF corresponding to the acquired policy set F; and
perform homomorphic computation g on the converted ciphertext ct~, to generate a ciphertext ct*.

2. The homomorphic computation device according to claim 1, wherein
a random number R is used to create the encryption element F,
the ciphertext ct includes an encryption element D in which the random number R is encrypted, and
the processing circuitry converts the encryption element C into the encryption element C~ with the encryption element F and the encryption element D.

3. The homomorphic computation device according to claim 2, wherein
the ciphertext ct includes the encryption element C represented in Formula 1, the encryption element $C_x$ represented in Formula 2, the encryption element F represented in Formula 3, and the encryption element D represented in Formula 4

$$C := \begin{bmatrix} A^T \\ B_0^T \\ v^T \end{bmatrix} \cdot S + \begin{bmatrix} E_A \\ E_0 \\ e_v^T \end{bmatrix} + \mu(I_{m+N+1} \otimes g^T) \quad \text{[Formula 1]}$$

where
superscript T designates transpose,
$A \in Z_q^{n \times m}$, with $Z_q$ representing a group of integers of order q, and A being a matrix of n rows and m columns on $Z_q$, where n and q are parameters in learning with errors (LWE) problem, $$B_0 \xleftarrow{U} Z_q^{n \times N},$$

with $B_0$ representing a matrix with n rows and N columns of uniform random numbers uniformly selected from the set $Z_q$, $$v \xleftarrow{U} Z_q^n,$$

with v representing a vector of n uniform random numbers uniformly selected from the set $Z_q$, $$S \xleftarrow{U} Z_q^{n \times M},$$

with S representing a matrix with n rows and M columns of uniform random numbers uniformly selected from the set $Z_q$, $$E_A \xleftarrow{R} \chi^{m \times M},$$

with $E_A$ representing a matrix of m rows and M columns randomly selected in accordance with a distribution of $\chi$, where $\chi$ is a parameter of LWE problem, $E_0 := [E_0[1], \ldots, E_0[M]]$, $E_0[j] := R_{0,j}^T E_A[j]$ for $j=1, \ldots, M$, $$R_{0,j} \xleftarrow{U} \{0, 1\}^{m \times N}$$

for $j=1, \ldots, M$, with $R_{0,j}$ representing, for each integer j, a matrix with m rows and N columns of uniform random numbers uniformly selected from the set $\{0,1\}$, $$e_v \xleftarrow{R} \chi^M,$$

with $e_v$ representing a vector of M numbers randomly selected in accordance with the distribution of $\chi$, where $\chi$ is a parameter of LWE problem,
$\mu$: plaintext,
$I_{m+N+1}$: unit matrix of m+N+1 rows and m+N+1 columns,
$m, N, M \in Z$, $g^T := (1, 2, \ldots, 2^{\lceil \log q \rceil})$ $$C_x := [\vec{B}_x - x\vec{G}]^T \cdot S + \begin{bmatrix} E_1 \\ \vdots \\ E_L \end{bmatrix} \quad \text{[Formula 2]}$$

where $$\vec{B}_x := [B_1, \ldots, B_L],$$

$$B_1, \ldots, B_L \xleftarrow{U} Z_q^{m \times N},$$

x: attribute, $$\vec{G} := I_{m+N+1} \otimes g^T,$$

$$E_i := [E_i[1], \ldots, E_i[M]] \text{ for } i=1, \ldots, L,$$

$$E_i[j] := R_{i,j}^T E_A[j] \text{ for } i=1, \ldots, L; j=1, \ldots, M,$$

$$R_{i,j} \xleftarrow{U} \{0, 1\}^{m \times N}$$

for $i=1, \ldots, L$; $j=1, \ldots, M$ $$F := \begin{bmatrix} A^T \\ B^T \\ v^T \end{bmatrix} \cdot R + E_F + \mu(I_{m+N+1} \otimes g^T) \quad \text{[Formula 3]}$$

wherein $$B \xleftarrow{U} Z_q^{m \times N},$$

$$R \xleftarrow{U} Z_q^{m \times N},$$

$$E_F \xleftarrow{R} \chi^{(m+N+1) \times M},$$

$\chi$: parameter of learning with errors (LWE) problem, $$D := \left( I_N \otimes \begin{bmatrix} A^T \\ B_0^T \\ v^T \end{bmatrix} \right) \cdot \begin{bmatrix} S^{(1)} \\ \vdots \\ S^{(N)} \end{bmatrix} + \begin{bmatrix} E^{(1)} \\ \vdots \\ E^{(N)} \end{bmatrix} + R \otimes g \otimes e_{m+N+1} \quad \text{[Formula 4]}$$

where $$S^{(1)}, \ldots, S^{(N)} \xleftarrow{U} Z_q^{n \times M},$$

$$E^{(k)} := [(E_A^{(k)})^T \| (E_0^{(k)})^T \| e_v^{(k)}]^T \text{ for } k=1, \ldots, N,$$

$$E_A^{(k)} \xleftarrow{R} \chi^{m \times M}$$

for $k=1, \ldots, N$, with $E^{(k)}_A$ representing, for each integer k, a matrix of m rows and M columns randomly selected in accordance with a distribution of $\chi$, where $\chi$ is a parameter of LWE problem, $$E_0^{(k)} := [E_0^{(k)}[1], \ldots, E_0^{(k)}[M]] \text{ for } k=1, \ldots, N,$$

$$E_0^{(k)}[j] := (R_{0,j}^{(k)})^T E_A^{(k)}[j] \text{ for } j=1, \ldots, M; k=1, \ldots, N,$$

$$v \xleftarrow{U} Z_q^n,$$

with v representing a vector of n uniform random numbers uniformly selected from the set $Z_q$, $$e_v^{(k)} \xleftarrow{R} \chi^M$$

for $k=1, \ldots, N$, with $e^{(k)}_v$ representing, for each integer k, a vector of M numbers randomly selected in accordance with the distribution of $\chi$, where $\chi$ is a parameter of LWE problem, $$R_{0,j}^{(k)} \xleftarrow{U} Z_q^{m \times N}$$

for $j=1, \ldots, M$, with $R^{(k)}_{0,j}$ representing, for each integer j, a matrix with m rows and N columns of uniform random numbers uniformly selected from the set $Z_q$, $e_{m+N+1}$: vector in which $(m+N+1)$-th element is 1 and other elements are 0.

4. The homomorphic computation device according to claim 3, wherein the processing circuitry converts the encryption element C into an encryption element $\hat{C}_f$ as represented in Formula 5, and converts the encryption element $\hat{C}_f$ into the encryption element $C^\sim$ as represented in Formula 6

$$\hat{C}_f := C + \begin{bmatrix} 0_{m \times M} \\ C_f \\ 0_{1 \times M} \end{bmatrix} \quad \text{[Formula 5]}$$

where $$C_f = H^T C_x,$$

$$H := \text{EvRelation}(f, x, \vec{B}_x)$$

$$C^\sim := \begin{bmatrix} \hat{C}_f & X \\ 0 & F \end{bmatrix} \quad \text{[Formula 6]}$$

where $$X := (s \otimes I_n) \cdot D_{\tilde{f}},$$

$$s := (I_n \otimes g^{-T})((B_f - B) r'_f),$$

$I_n$: unit matrix of n rows and n columns, $$D_{\tilde{f}} := D_f + D,$$

$$D_f := [0_{M \times m} \| (D_f^{(1)})^T \| 0_M \| \ldots \| 0_{M \times m} \| (D_f^{(N)})^T \| 0_M]^T,$$

$$E_i^{(k)} := [E_i^{(k)}[1], \ldots, E_i^{(k)}[M]] \text{ for } i=1, \ldots, L; k=1, \ldots, N,$$

$$E_i^{(k)}[j] := (R_{i,j}^{(k)})^T E_A^{(k)}[j] \text{ for } i=1, \ldots, L; j=1, \ldots, M; k=1, \ldots, N,$$

$$R_{i,j}^{(k)} \overset{U}{\leftarrow} Z_q^{m \times N}$$

for j=1, ..., L; j=1 ..., M $$D_f^{(i)} := H^T D_x^{(i)} \text{ for } i=1, \ldots, k,$$

$$D_x^{(k)} := (\vec{B}_x - x\vec{G}) \cdot S^{(k)} + \begin{bmatrix} E_1^{(k)} \\ \vdots \\ E_L^{(k)} \end{bmatrix}$$

$$B_f := \text{Eval}(f, \vec{B}_x),$$

$$r'_f \in \{0,1\}^N.$$

5. The homomorphic computation device according to claim 4, wherein
the processing circuitry performs the homomorphic computation g on the encryption element C~ to generate an encryption element C*, performs the homomorphic computation g on the encryption element F to generate an encryption element F*, performs the homomorphic computation g on an encryption element D~ obtained by converting the encryption element D to generate an encryption element D*, and generates the ciphertext ct* including the encryption element C*, the encryption element F*, and the encryption element D*.

6. The homomorphic computation device according to claim 5, wherein
the processing circuitry converts the encryption element D into the encryption element D~ as represented in Formula 7

$$D^\sim := \left( I_N \otimes \begin{bmatrix} I_{n'} \\ 0_{(m+N+1) \times n'} \end{bmatrix} \right) \cdot D_f^\wedge \quad \text{[Formula 7]}$$

where
$0_{(m+N+1) \times n'}$ is a zero matrix of m+N+1 rows and n' columns,
$I_N$: unit matrix of N rows and N columns,
$I_{n'}$: unit matrix of n' rows and n' columns $I_N$: unit matrix of N rows and N columns.

7. The homomorphic computation device according to claim 3, wherein
the processing circuitry performs the homomorphic computation g on the encryption element C~ to generate an encryption element C*, performs the homomorphic computation g on the encryption element F to generate an encryption element F*, performs the homomorphic computation g on an encryption element D~ obtained by converting the encryption element D to generate an encryption element D*, and generates the ciphertext ct* including the encryption element C*, the encryption element F*, and the encryption element D*.

8. The homomorphic computation device according to claim 7, wherein
the processing circuitry converts the encryption element D into the encryption element D~ as represented in Formula 7

$$D^\sim := \left( I_N \otimes \begin{bmatrix} I_{n'} \\ 0_{(m+N+1) \times n'} \end{bmatrix} \right) \cdot D_f^\wedge \quad \text{[Formula 7]}$$

where
$0_{(m+N+1) \times n'}$ is a zero matrix of m+N+1 rows and n' columns, $D_f := D_f + D,$ $D_f := [0_{M \times m} \| (D_f^{(1)})^T \| 0_M \| \ldots \| 0_{M \times m} \| (D_f^{(N)})^T \| 0_M]^T,$ $D_f^{(i)} := H^T D_x^{(i)} \text{ for } i=1, \ldots, k,$ $E_i^{(k)} := [E_i^{(k)}[1], \ldots, E_i^{(k)}[M]] \text{ for } i=1, \ldots, L; k=1, \ldots, N,$ $E_i^{(k)}[j] := (R_{i,j}^{(k)})^T E_A^{(k)}[j] \text{ for } i=1, \ldots, L; j=1, \ldots, M; k=1, \ldots, N,$ $$R_{i,j}^{(k)} \overset{U}{\leftarrow} Z_q^{m \times N}$$

for i=1, ..., L; j=1, ..., M $$D_f^{(i)} := H^T D_x^{(i)} \text{ for } i=1, \ldots, k,$$

$$D_x^{(k)} := (\vec{B}_x - x\vec{G}) \cdot S^{(k)} + \begin{bmatrix} E_1^{(k)} \\ \vdots \\ E_L^{(k)} \end{bmatrix},$$

$I_N$: unit matrix of N rows and N columns,
$I_{n'}$: unit matrix of n' rows and n' columns $I_N$: unit matrix of N rows and N columns.

9. The homomorphic computation device according to claim 1, wherein
the processing circuitry generates the ciphertext ct* including an encryption element C* generated by performing homomorphic computation g on the encryption element C~,
acquires the generated ciphertext ct*, and
converts a ciphertext ct* into a ciphertext ct~ by converting, with the encryption element F, the encryption element C* included in the ciphertext ct* into an encryption element C~ that can be decrypted with a decryption key $sk_F'$ different from the decryption key $sk_F$.

10. An encryption system comprising:
an encryption device to generate a ciphertext ct including
an encryption element C in which a plaintext μ is encrypted, the encryption element C being decryptable by a decryption key $sk_f$ corresponding to a policy f satisfied by the attribute x,
an encryption element $C_x$ created using an attribute x, and
an encryption element F in which the plaintext μ is encrypted, the encryption element F only being decryptable by a different key than the decryption key $sk_f$ corresponding to the policy f satisfied by the attribute x, the different key corresponding to a policy, which is different than the policy f, and which is satisfied by an attribute different than the attribute x; and a homomorphic computation device to convert the ciphertext ct into a ciphertext ct˜ by converting, with the encryption element F, the encryption element $C_x$ included in the ciphertext ct generated by the encryption device, into an encryption element C˜ that can be decrypted with a decryption key $sk_F$ corresponding to a policy set F that is a set of policies including the policy f and the policy different than the policy f, and perform homomorphic computation g on the converted ciphertext ct˜ to generate a ciphertext ct*.

11. A non-transitory computer readable medium storing a homomorphic computation program to cause a computer to execute:

a ciphertext acquisition process of acquiring a ciphertext ct including
- an encryption element C in which a plaintext μ is encrypted, the encryption element C being decryptable by a decryption key $sk_f$ corresponding to a policy f satisfied by the attribute x,
- an encryption element $C_x$ created using an attribute x, and
- an encryption element F in which the plaintext μ is encrypted, the encryption element F only being decryptable by a different key than the decryption key $sk_f$ corresponding to the policy f satisfied by the attribute x, the different key corresponding to a policy, which is different than the policy f, and which is satisfied by an attribute different than the attribute x;

a policy acquisition process of acquiring a policy set F that is a set of policies including the policy f and the policy different than the policy f;

a ciphertext conversion process of converting the ciphertext ct into a ciphertext ct˜ by converting, with the encryption element F, the encryption element $C_x$ included in the ciphertext ct acquired in the ciphertext acquisition process, into an encryption element C˜ that can be decrypted with a decryption key $sk_F$ corresponding to the policy set F acquired in the policy acquisition process; and a homomorphic computation process of performing homomorphic computation g on the ciphertext ct˜ converted in the ciphertext conversion process, to generate a ciphertext ct*.

* * * * *